United States Patent
Atagi et al.

(10) Patent No.: US 6,921,730 B2
(45) Date of Patent: Jul. 26, 2005

(54) GLASS COMPOSITION, PROTECTIVE-LAYER COMPOSITION, BINDER COMPOSITION, AND LAMP

(75) Inventors: Tomoko Atagi, Takatsuki (JP); Masanobu Ito, Kyoto (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/388,084

(22) Filed: Mar. 13, 2003

(65) Prior Publication Data

US 2003/0181308 A1 Sep. 25, 2003

(30) Foreign Application Priority Data

Mar. 14, 2002 (JP) ........................... 2002-070937
Mar. 27, 2002 (JP) ........................... 2002-089676
Mar. 28, 2002 (JP) ........................... 2002-093017

(51) Int. Cl.[7] ................ C03C 3/66; C03C 3/95; H01K 1/32; H01J 61/46
(52) U.S. Cl. ............. 501/64; 501/32; 252/301.4 F; 252/301.4 R; 252/301.6 F; 313/487; 313/489; 313/636; 313/635; 313/642; 313/485
(58) Field of Search ............ 252/301.4 R; 427/67, 427/71; 501/64, 32, 152; 313/487, 489, 636, 635, 642, 485, 301.4 F, 301.6 F, 301.36

(56) References Cited

U.S. PATENT DOCUMENTS

| | | | | |
|---|---|---|---|---|
| 4,338,403 A | * | 7/1982 | Kawashima et al. | 501/136 |
| 4,544,997 A | * | 10/1985 | Seuter et al. | 362/263 |
| 4,798,681 A | * | 1/1989 | Oversluizen et al. | 252/301.4 F |
| 4,890,033 A | * | 12/1989 | Ichinomiya et al. | 313/487 |
| 5,391,320 A | * | 2/1995 | Buchanan et al. | 252/301.4 F |
| 5,417,886 A | * | 5/1995 | Tateiwa et al. | 252/301.4 R |
| 5,516,227 A | * | 5/1996 | Kozak et al. | 404/9 |
| 5,541,471 A | * | 7/1996 | Terheijden et al. | 313/112 |
| 5,844,350 A | * | 12/1998 | Scott et al. | 313/25 |
| 6,229,257 B1 | | 5/2001 | Kondoh et al. | |
| 6,280,656 B1 | * | 8/2001 | O'Rourke et al. | 252/301.4 F |
| 6,323,585 B1 | * | 11/2001 | Crane et al. | 313/112 |
| 6,358,873 B1 | * | 3/2002 | Stewart | 501/64 |
| 6,391,810 B1 | * | 5/2002 | Lenhart | 501/59 |
| 6,531,074 B2 | * | 3/2003 | Trumble et al. | 252/301.4 R |
| 6,555,963 B1 | * | 4/2003 | Snijkers-Hendrickx et al. | 313/638 |
| 2002/0070682 A1 | * | 6/2002 | Atagi | 315/246 |

FOREIGN PATENT DOCUMENTS

| | | | |
|---|---|---|---|
| JP | 03-221583 | * | 9/1991 |
| JP | 10-167755 | | 6/1998 |
| JP | 11-135071 | | 5/1999 |
| JP | 2001-279182 | | 10/2001 |

* cited by examiner

Primary Examiner—C. Melissa Koslow

(57) ABSTRACT

A phosphor layer is composed of tri-band phosphor particles bound together by a binder. A material as the main component of the binder is a mixture of (1) a compound formed by calcium oxide, barium oxide, and boron oxide, and (2) calcium pyrophosphate. Dissolved in the main component material of the binder is a luminescent component that converts ultraviolet radiation of 254 nm to ultraviolet radiation of longer wavelengths or to visible light. Examples of such a luminescent component include an oxide of gadolinium (Gd), terbium (Tb), europium (Eu), neodymium (Nd), or dysprosium (Dy), each of which belongs to lanthanum series, and an oxide of thallium (Tl), tin (Sn), lead (Pb), or bismuth (Bi).

14 Claims, 10 Drawing Sheets

GLASS COMPOSITION, PROTECTIVE-LAYER COMPOSITION, BINDER COMPOSITION, AND LAMP

This application is based on application Nos. 2002-70937, 2002-89676, and 2002-93017 all filed in Japan, each content of which is hereby incorporated by reference.

BACKGROUND OF THE INVENTION

(1) Field of the Invention

The present invention relates to a glass composition, a protective-layer composition, and a binder composition as well as to a lamp employing the compositions stated above.

(2) Description of the Related Art

Among various types of lamps, fluorescent lamps are known to have high luminous efficiency. A fluorescent lamp is generally composed of a discharge tube or vessel which is filled with mercury and a rare gas, and of which inner surface is coated with phosphors. Upon discharge generated within the discharge tube, the mercury is excited to emit ultraviolet radiation having a wavelength mainly of 254 nm. Upon exposure to the thus generated ultraviolet radiation, the phosphors are excited to emit visible light. With this mechanism, the luminous flux of the fluorescent lamp is obtained. Conventionally known fluorescent lamps include a straight tube type, and a circular tube type in addition to a bulb-shaped type and a compact type, which are recently introduced to the market.

HID (High Intensity Discharge) lamps, on the other hand, collectively refer to high-pressure mercury discharge lamps, metal halide lamps, and high-pressure sodium lamps. A high-pressure mercury discharge lamp emits light upon discharge in mercury vapor under a pressure of 100 to 1000 kPa. A metal halide lamp emits light when discharge is generated to dissociate metal halide into metal atoms and halogen atoms, and the metal atoms are excited to emit visible light. A high-pressure sodium lamp emits light upon discharge in sodium vapor.

Fluorescent lamps and HID lamps as above are required to be low energy consuming, capable of generating high luminous flux, and long-lived. To achieve the required performance capabilities, various research and development are being made.

As one example, JP Publication No.11-167899-A discloses a technique for extending life of a fluorescent lamp. The technique is developed in view of the following drawback of a conventional fluorescent lamp employing soda glass. That is, during manufacturing or operation of a fluorescent lamp, sodium is eluted from the glass to react with mercury, which tends to reduce luminous intensity of the lamp. In order to suppress such reduction in luminous intensity, the disclosure teaches to employ glass having such a characteristic that alkali is less likely to be eluted in comparison with a conventional soda glass.

In another example, an attempt is made on a fluorescent lamp to obtain higher luminous flux by increasing luminous intensity of phosphors. Similar attempt is made by making a discharge tube thinner to increase the arc length.

Thanks to those research and development, fluorescent lamps and HID lamps have increased in performance to some extent. Yet, the recent demand for the performance capabilities is more intense than ever. To meet the demand, there is a need for techniques to further improve a lamp to be lower energy consuming, or to be capable of higher luminous flux.

SUMMARY OF THE INVENTION

The present invention is made in view of the above background, and has an object to improve luminous efficiency of lamps, such as fluorescent lamps and HID lamps, that emit light through discharge.

To achieve the object stated above, in one aspect of the present invention, a glass composition for a lamp contains silicon dioxide as a main component, and a luminescent component including two different rare-earth oxides. One of the two rare-earth oxides is selected from the first group consisting of gadolinium oxide, terbium oxide, and praseodymium oxide, and the other is selected from the second group consisting of europium oxide, terbium oxide, dysprosium oxide, and neodymium oxide.

By the presence of the two different rare-earth oxides as a luminescent component, the glass composition converts ultraviolet radiation having a wavelength of 254 nm to visible light more effectively when compared with the glass composition containing no or only one rare-earth oxide. This is ascribable to the combined action of the first and the second rare-earth oxides.

The first rare-earth oxide is excited by ultraviolet radiation having a wavelength of 254 nm to emit near ultraviolet radiation, which has a longer wavelength. On the other hand, the second rare-earth oxide is excited to emit visible light when exposed to ultraviolet radiation of 254 nm. In addition, the second rare-earth oxide also converts near ultraviolet radiation, which has a longer wavelength and is emitted from the first rare-earth oxide, to visible light. In other words, the first rare-earth oxide converts 254 nm radiation to near ultraviolet radiation, thereby serving as intermediary for the transmission of the radiation to the second rare-earth oxide. With this action of the first rare-earth oxide, the ultraviolet radiation is converted to visible light with higher efficiency than direct conversion to visible light only by the second rare-earth oxide.

In addition, the near ultraviolet radiation emitted from the first rare-earth oxide is kept from being irradiated toward outside the discharge tube. Thus, the radiant energy of so-called hazardous ultraviolet radiation of 380 nm or shorter is kept at a level not exceeding $0.2\ \mu W/cm^2/1000\ lx$.

More preferably, in the above glass composition, a content of each rare-earth oxide selected from the first and the second groups may be 0.01 to 30 wt %.

In another aspect of the present invention, a glass composition for a lamp contains silicon dioxide as a main component, and a luminescent component. The luminescent component includes at least one rare-earth oxide selected from the group consisting of praseodymium oxide, neodymium oxide, europium oxide, gadolinium oxide, terbium oxide, and dysprosium oxide.

By the presence of a luminescent component, such as praseodymium oxide, neodymium oxide, europium oxide, gadolinium oxide, terbium oxide, or dysprosium oxide, the glass composition serves to improve luminous efficiency of the lamp.

Generally, when a rare-earth oxide is added to the glass composition, there is a problem that the rare-earth oxide is localized by a glass component. The localization may result in that adjacent rare-earth elements mutually give and receive energy and thus are brought back into the ground state. In such cases, the rare-earth oxide contributes little to improve luminous efficiency of the lamp.

To address the above problem, the glass composition of the present invention may contain silicon dioxide as a main component, and at least one rare-earth oxide selected from the group consisting of praseodymium oxide, neodymium oxide, europium oxide, gadolinium oxide, terbium oxide, and dysprosium oxide, together with at least one of aluminum oxide and diboron trioxide. A content of the aluminum oxide or diboron trioxide is not less than 1 wt %. By the presence of at least one of aluminum oxide and diboron trioxide in an amount not less than 1 wt %, the rare-earth oxides are sufficiently dispersed so as to prevent energy transfer between adjacent rare-earth elements that may occur if the rare-earth oxide elements are localized.

Accordingly, it is concluded the glass composition stated above is effective to improve luminous efficiency of the lamp.

Preferably, the above-stated glass composition containing one rare-earth oxide as a luminescent component is further limited by one set of the specific components (1) to (4) listed below.

(1) silicon dioxide: 60 to 75 wt %,
  aluminum oxide: 1 to 5 wt %,
  $R_2O$: 3 to 30 wt %,
  R'O: 3 to 20 wt %, and
  rare-earth oxide: 0.01 to 30 wt %
(2) silicon dioxide: 55 to 85 wt %,
  aluminum oxide: 1 to 8 wt %,
  diboron trioxide: 5 to 20 wt %,
  at least either $R_2O$ or R'O: 0 to 10 wt %, and
  rare-earth oxide: 0.01 to 30 wt %
(3) silicon dioxide: 55 to 85 wt %,
  aluminum oxide: 0 to 5 wt %,
  diboron trioxide: 0 to 5 wt %,
  at least either $R_2O$ or R'O: 0 to 15 wt %,
  lead oxide: 1 to 40 wt %, and
  rare-earth oxide: 0.01 to 30 wt %
(4) silicon dioxide: 75 to 98.7 wt %,
  aluminum oxide: 0.1 to 3 wt %,
  diboron trioxide: 0.1 to 3 wt %,
  $R_2O$: 0.1 to 3 wt %, and
  rare-earth oxide: 0.01 to 30 wt %

Note that the component R stated above represents at least one selected from the group consisting of lithium (Li), sodium (Na), and potassium (K). The component R' represents at least one selected from the group consisting of magnesium (Mg), calcium (Ca), strontium (Sr), barium (Ba), and zinc (Zn). The rare-earth element is at least one selected from the group consisting of praseodymium (Pr), neodymium (Nd), europium (Eu), gadolinium (Gd), terbium(Tr), and dysprosium (Dy).

As stated above, each glass composition specified as above (1)–(4) contains at least one of aluminum oxide and diboron trioxide in an amount not less than 1 wt %.

The glass composition specified as (1) contains $R_2O$ and R'O that serve to shift ultraviolet absorption edge of the glass (a marine of wavelength up to which the glass blocks ultraviolet radiation incident thereto) to a longer wavelength. In synergy with the ultraviolet adsorption by the rare-earth element, the presence of $R_2O$ and R'O achieves an effect of suppressing the passage of the ultraviolet radiation through the glass. The above contents of $R_2O$ and R'O are suitably specified to achieve the effect. The glass composition specified as (1) is suitable to be used as a connecting portion of a discharge tube to lead glass.

Note that it is also applicable that the glass composition specified as (1) may additionally contain aluminum oxide in an amount of 5 wt % or less.

The glass composition specified as (2) contains a smaller amount of $R_2O$ but a greater amount of diboron trioxide when compared with the glass composition specified as (1). By the presence of such components, the glass composition advantageously has a relatively high melting point and a corrosion resistance at high heat.

Note that the glass composition specified as (2) contains diboron trioxide within the range from 5 to 20 wt % for the following reasons. When the content is 5 wt % or greater, the presence of diboron trioxide serves to improve luminous flux significantly. Further, when the content is at most 20 Wt %, the presence of diboron trioxide does not cause any possibility of phase separation of glass. The glass composition specified as (2) is suitable for the use as a discharge tube.

The glass composition specified as (3) has an excellent ultraviolet adsorption as described above. In addition, by the presence of lead, the glass composition has good electrical insulation. The electrical insulation is obtained when the lead content is 1 wt % or greater. Yet, when the lead content exceeds 40 wt %, viscosity of the glass decreases to the extent to exert adverse influence on the workability. The glass composition specified as (3) is suitable to be used as a portion of a lamp electrode.

The glass composition specified as (4) has an excellent ultraviolet adsorption as described above. In addition, since the content of silicon dioxide is greater as compared to the glass compositions specified as (1) to (3), the glass composition has excellent heat resistance and transparency. The presence of aluminum oxide and diboron trioxide achieves, in addition to the above effects, an effect of helping the rare-earth oxide to exist in the glass composition.

Further, when the content is 0.1 wt % or greater, $R_2O$ serves to break the network of silicon dioxide so that there are spaces for rare-earth ions, which are relatively large in the ionic radius, to be present. However, when the content is greater than 3 wt %, the melting point of the silicon dioxide becomes too low, whereby the high-temperature performance of the glass composition is impaired.

In another aspect of the present invention, a protective-layer composition for a lamp contains a metal oxide as a main component, and a luminescent component including two different rare-earth oxides. One of the two rare-earth oxides is selected from the first group consisting of gadolinium oxide, terbium oxide, and praseodymium oxide, and the other is selected from the second group consisting of europium oxide, terbium oxide, dysprosium oxide, and neodymium oxide.

With this arrangement, the protective-layer composition converts ultraviolet radiation to visible light with high efficiency In another aspect of the present invention, a protective-layer composition for a lamp contains a metal oxide as a main component, and at least one rare-earth oxide selected from the group consisting of praseodymium oxide, neodymium oxide, europium oxide, gadolinium oxide, terbium oxide, and dysprosium oxide.

The protective-layer composition stated above also serves to improve luminous efficiency of the lamp.

Generally, a phosphor layer for use in a lamp is formed by biding phosphor particles by a binder. In another aspect of the present invention, a binder composition contains two different rare-earth oxides one of which is selected from the first group consisting of gadolinium oxide, terbium oxide, and praseodymium oxide, and the other of which is selected from the second group consisting of europium oxide, terbium oxide, dysprosium oxide, and neodymium oxide. Similarly to the glass compositions and the protective-layer compositions stated above, the binder composition contributes to improve luminous efficiency of the lamp. In another aspect of the present invention, a binder composition contains at least one rare-earth oxide selected from the group consisting of praseodymium oxide, neodymium oxide, europium oxide, gadolinium oxide, terbium oxide, and dysprosium oxide. With this arrangement, the binder composition serves to improve luminous efficiency of the lamp.

The glass compositions, the protective-layer compositions, and the binder compositions may be applied to various lamps including fluorescent lamp and HID lamps.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

[Embodiment 1]

Figure 1:
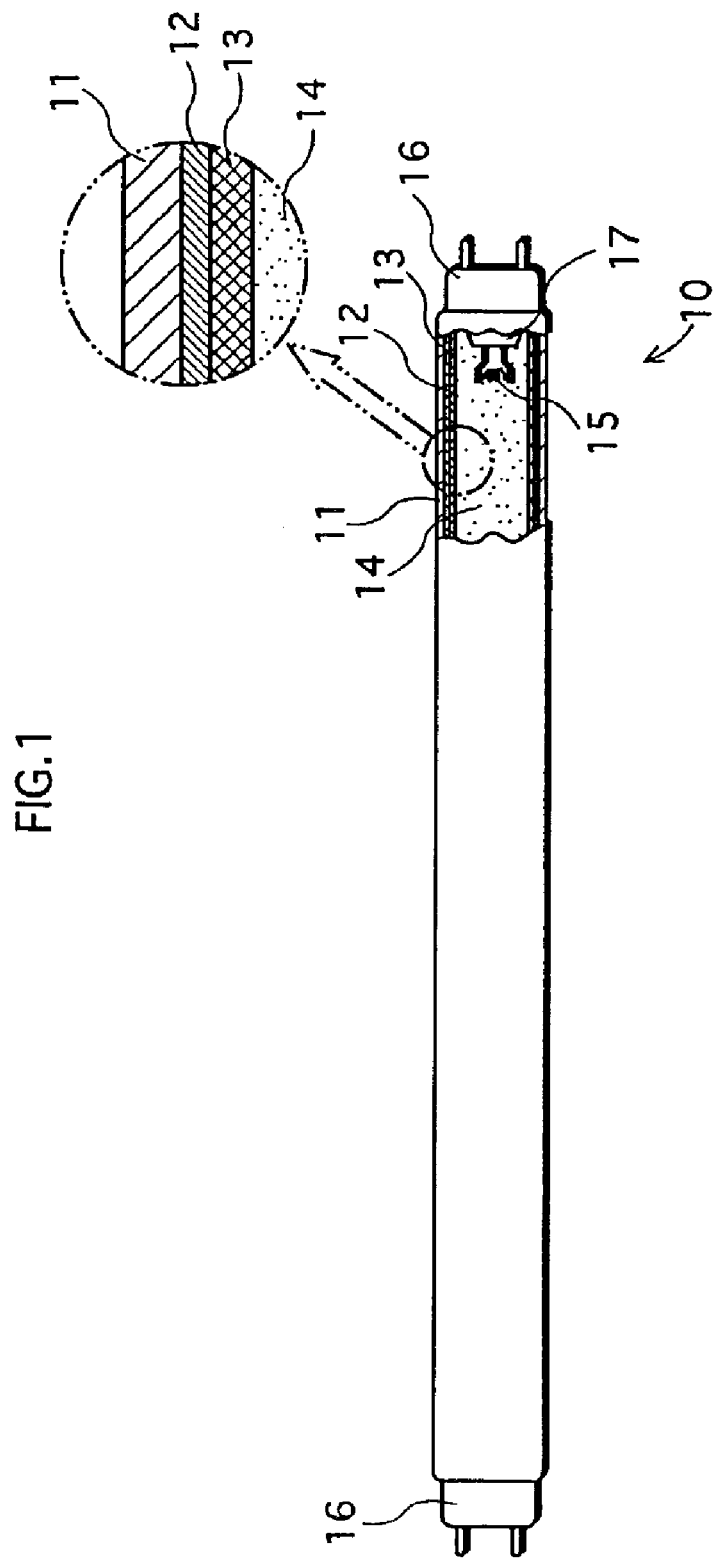
FIG. 1 is a side view (partially sectioned) of a fluorescent lamp according to an embodiment 1 of the present invention.
Figure 2:
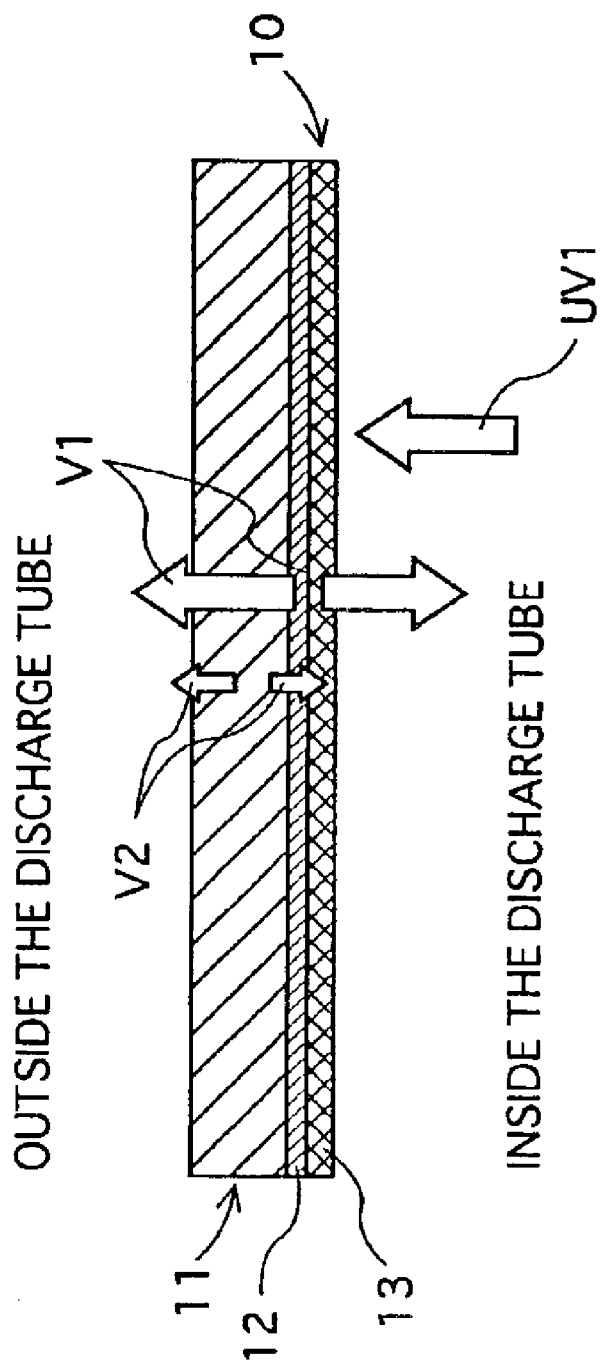
FIG. 2 is a schematic view showing light emission mechanism of the fluorescent lamp shown in FIG. 1.

FIG. 1 is a side view (partially sectioned) of a straight type fluorescent lamp. FIG. 2 is a schematic view showing light emission mechanism of the fluorescent lamp.

As shown in FIG. 1, a fluorescent lamp 10 is composed of a tubular glass tube 11 provided with a cap 16 fixedly attached to each end.

As shown in the cross-sectional part in FIG. 1, a protective layer 12 is formed on the inner surface of the glass tube 11, and a phosphor layer 13 is formed on the protective layer 12. A discharge space 14 enclosed with the phosphor layer 13 is filled with a rare gas such as argon together with mercury. The sealing pressure is within a range of 2–4 hPa, for example.

The glass tube 11 is formed of a material mainly containing soda glass. The material also contains a rare-earth oxide, which will be described later.

The protective layer 12 is a layer mainly composed of an oxide selected from $SiO_2$, $\alpha$-$Al_2O_3$, $\gamma$-$Al_2O_3$, $TiO_2$, ZnO, $B_2O_3$, $Sc_2O_3$, $Y_2O_3$, MgO, and $Cs_2O$. The protective layer 12 serves to keep sodium (Na) from being eluted from the glass tube 11 that would otherwise come into contact with the mercury (Hg) sealed in the discharge space 14. With this function of the protective layer 12, the luminous flux maintenance factor is improved. The protective layer 12 is preferably 0.01–1 $\mu$m in thickness.

The phosphor layer 13 is a layer formed on the protective layer 12 with tri-band phosphor particles bound together by a binder.

Further, an electrode 15 is provided at each side of the discharge space 14. Each of the electrodes 15 is formed by a coil filament coated with an emitter (an emissive material). In the figure, shown at the right is a cathode, and at the left is an anode (not illustrated in FIG. 1). Each electrode is fixed in place at the bottom by electrode glass 17.

(Glass Composition for Glass Tube 11)

A glass composition used for forming the glass tube 11 is basically similar to generally-known soda glass in components. The glass composition contains the following components.

$SiO_2$: 60–75 wt %,
$Al_2O_3$: 1–5 wt %,
$B_2O_3$: 0–5 wt %,
$R_2O$: 3–30 wt % (where R is at least one element selected from Li, Na, and K), and
R'O: 3–20 wt % (where R' is at least one element selected from Mg, Ca, Sr, Ba, and Zn).

Following is the reasons for specifying the range of content of each component as above.

$SiO_2$ is a component forming the skeleton structure of glass, so that it is generally preferable to contain a large amount of $SiO_2$. The $SiO_2$ content below 60 wt % undesirably results in decrease in electric resistance and workability. On the other hand, the $SiO_2$ content exceeding 75 wt % results in the glass with excessively-high softening temperature. Such a high softening temperature leads to reduction in formability of the glass and an excessively-low thermal expansion coefficient.

Referring now to $Al_2O_3$, the $Al_2O_3$ content below 1 wt % results in lower chemical durability. The $Al_2O_3$ content exceeding 5 wt %, on the other hand, leads to heterogeneity of the glass so that more striae are likely to be generated.

$B_2O_3$ is a component which is added optionally. Yet, addition of a small amount of $B_2O_3$ serves to increase strength and durability of the resulting glass as well as to suppress devitrification. On the other hand, the $B_2O_3$ content exceeding 5 wt %, the thermal expansion coefficient becomes too small.

Referring now to $R_2O$, when the $R_2O$ content is 3 wt % or greater, a so-called alkali-mixture effect is achieved along with cost reduction. However, when the $R_2O$ content exceeds 30 wt %, the thermal expansion coefficient becomes too great.

The R'O content not less than 3 wt % serves to improve the glass in hardness, electric insulation, and chemical durability. However, when the R'O content exceeds 20 wt %, devitrification is more likely to occur.

To be noted is that, according to the present embodiment, the glass composition of the glass tube 11 contains following components additionally to the above basic components. That is, the glass composition additionally contains a first rare-earth oxide selected from the first group consisting of gadolinium oxide ($Gd_2O_3$), terbium oxide ($Tb_2O_3$) and praseodymium oxide ($Pr_2O_3$), and a second rare-earth oxide selected from the second group consisting of europium oxide ($Eu_2O_3$), terbium oxide ($Tb_2O_3$), dysprosium oxide ($Dy_2O_3$), and neodymium oxide ($Nd_2O_3$). The first rare-earth oxide and the second rare-earth oxide are each contained within the range of 0.01–30 wt %.

The first rare-earth oxides, $Gd_2O_3$, $Tb_2O_3$, and $Pr_2O_3$ named above all have property of emitting, under excitation by ultraviolet radiation of 254 nm, near ultraviolet radiation having a longer wavelength.

On the other hand, the second rare-earth oxides, $Eu_2O_3$, $Tb_2O_3$, $Dy_2O_3$, and $Nd_2O_3$ named above all have property of emitting visible light under excitation by ultraviolet radiation.

Note that $Tb_2O_3$ is named both as the first and second rare-earth oxide as it has property of both. Yet, $Tb_2O_3$ should not be selected as the first rare-earth oxide when it is selected as the second rare-earth oxide, and vice versa.

The glass composition as described above used to form the glass tube 11 is obtained by adding powder of the above rare-earth oxides to a conventional soda glass material that has not yet been dissolved. The resulting mixture is then dissolved and formed.

(Effects Achieved by Manufacturing Glass Tube 11 from Glass Composition Stated Above)

FIG. 2 is a view showing the light emission mechanism of the above fluorescent lamp.

The fluorescent lamp of the present embodiment is similar to a conventional fluorescent lamp in the mechanism to generate luminous flux. That is, when a voltage is applied through a lighting circuit to the electrodes in the fluorescent lamp 10, discharge is generated in the discharge space inside the fluorescent lamp 10. Upon discharge, the mercury and rare gas sealed within the fluorescent lamp 10 are excited to emit ultraviolet radiation UV1 (having a main wavelength of 254 nm). The phosphor layer 13 is then irradiated with the ultraviolet radiation UV1, so that the phosphor particles are excited to emit visible light V1 (having a wavelength of about 400 nm or longer). The visible light V1 radiated through the glass tube 11 constitutes most of the luminous flux of the fluorescent lamp 10.

In addition to the primary luminous flux described above, the fluorescent lamp of the present embodiment also emits secondary luminous flux (visible light V2) through the mechanism described below.

That is, part of the ultraviolet radiation UV1 generated inside the fluorescent lamp 10 passes through the phosphor layer 13 and reaches the glass tube 11. As stated above, the glass tube 11 contains the first and the second rare-earth oxides. As a consequence, under excitation of the rare-earth oxides by the ultraviolet radiation UV1, the glass tube 11 emits visible light V2.

To sum up, the fluorescent lamp of the present embodiment emits, in addition to the main luminous flux (visible light V1), the secondary luminous flux (visible light V2) because the first and the second rare-earth oxides contained in the glass tube 11 serve as luminescent components. Thus, the luminous efficiency of the lamp increases.

Especially noted is that the presence of both the first rare-earth oxide and the second rare-earth oxide leads to high luminous efficiency. This is be ascribable to that the combined action of the first and the second rare-earth oxides serves to convert ultraviolet radiation of 254 nm to visible light with high efficiency.

To be more specific, the first rare-earth oxide is excited by ultraviolet radiation having a wavelength of 254 nm to emit near ultraviolet radiation, which has a longer wavelength (about 315 nm in the case of $Gd_2O_3$).

On the other hand, the second rare-earth oxide is excited to emit visible light (about 610 nm in the case of $Eu_2O_3$) when exposed to ultraviolet radiation of 254 nm. In addition, the second rare-earth oxide is also excited to emit visible light when exposed to near ultraviolet radiation, which is emitted from the first rare-earth oxide.

By the combined action of the first and the second rare-earth oxides, ultraviolet radiation of wavelength 254 nm is converted to visible light more effectively than solely by the second rare-earth oxide. In addition, near ultraviolet radiation, which is emitted by the first rare-earth oxide, is absorbed and used by the second rare-earth oxide without being leaked out.

As described above, the presence of both the first and the second rare-earth oxides serves to convert ultraviolet radiation to visible light with higher conversion efficiency than that achieved only by either of the oxides.

In other words, when there are both the first rare-earth oxide and the second rare-earth oxide, an equal amount of visible light V2 is obtained with less amount of rare-earth oxides than that with either of the first or second rare-earth oxide.

Further, when $Eu_2O_3$ and $Gd_2O_3$ are contained, the following effect is achieved. A glass composition containing $Eu_2O_3$ as the only rare-earth oxide inevitably results in glass colored pink. When both $Eu_2O_3$ and $Gd_2O_3$ are contained, a sufficient amount of visible light V2 is obtained with an extremely small amount of $Eu_2O_3$. That is, it is possible to obtain a glass with high conversion efficiency to visible light while suppressing coloration of the glass.

In order to realize conversion to visible light with high efficiency, it is preferable that the contents of first rare-earth oxide and the second rare-earth oxide each fall within the range of 0.01–30 wt % of the glass composition.

When the content of each rare-earth oxides is below 0.01 wt %, the content is too small to obtain a sufficient amount of visible light. When the content of each rare-earth oxide exceeds 30 wt %, on the other hand, the two rare-earth oxides mutually give and receive energy, which hinders release of light emission energy (this phenomenon is called concentration quenching).

According to the common rules for safety test of lighting products by Japan Electric Lamp Manufactures Association Standard No. 601 (hereinafter JEL 601), it is required that the amount of hazardous ultraviolet radiation having a wavelength of 380 nm or shorter be 0.1 $\mu W/cm^2$/1000 1x or less.

As confirmed by the examples below, the fluorescent lamp of the present embodiment is advantageous in that the amount of ultraviolet radiation of 380 nm or shorter is kept as low as 0.02 $\mu W/cm^2$/1000 lx or less due to the absorption of near ultraviolet radiation by the second rare-earth oxide.

[Confirmatory Test 1]

Following tests were performed to confirm effects achieved by the fluorescent lamp 10 of the embodiment 1.

First, 20 W straight-tube type fluorescent lamps of examples 1–6 were manufactured all in accordance with the embodiment 1.

In the examples 1, 2, and 6, each glass tube was manufactured from the glass composition containing $Gd_2O_3$ as the first rare-earth oxide, and $Tb_2O_3$ as the second rare-earth oxide. In the example 2, the $Gd_2O_3$ content was set to be higher than that in the example 1. In the example 6, the $Tb_2O_3$ content was set to be lower than that in the example 1.

In the example 3, the glass tube was manufactured from the glass composition containing $Gd_2O_3$ as the first rare-earth oxide, and $Eu_2O_3$ as the second rare-earth oxide.

In the example 4, the glass tube was manufactured from the glass composition containing $Gd_2O$ as the first rare-earth oxide, and $Dy_2O_3$ as the second rare-earth oxide.

In the example 5, the glass tube was manufactured from the glass composition containing $Pr_2O_3$ as the first rare-earth oxide, and $Tb_2O_3$ as the second rare-earth oxide.

In addition, fluorescent lamps of comparative examples 1–4 were manufactured in the similar manner to the examples 1–6 but with a different glass composition for a glass tube.

In the comparative example 1, the glass tube was manufactured from the glass composition containing no rare-earth oxide.

In the comparative examples 2–4, each glass tube was manufactured from the glass composition containing $Tb_2O_3$ as the only rare-earth oxide.

Measurements for thermal expansion coefficient α were carried out at temperatures of 30–380° C. in compliance with JIS R3102.

Measurements for glass transition temperature were carried out also in compliance with JIS R3102.

Measurements for softening temperature were carried out in compliance with JIS R3104.

Measurements for working temperature were carried out by reading a high-temperature viscosity curve for a temperature at the time the viscosity reached $10^3$ Pa·s.

Measurements for alkali elution amount were carried out in compliance with JIS R3502.

These measurement results show that all the glass compositions of the example and the comparative example were suitable to be used for manufacturing a glass tube.

Light Emission Property of Glass Composition:

Measurements were performed on the glass compositions used to manufacture the glass tubes of the examples 1 and 2 and of the comparative example 2 for emission spectrum emitted upon exposure to ultraviolet radiation of 254 nm.

TABLE 1

(Unit: wt %)

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Glass Composition | $SiO_2$ | 67.0 | 65.0 | 66.0 | 66.5 | 68.0 | 67.5 | 70.5 | 68.0 | 66.0 | 64.0 |
| | $Al_2O_3$ | 1.5 | 1.5 | 1.0 | 2.0 | 0.5 | 1.5 | 1.2 | 2.0 | 1.5 | 0.5 |
| | $B_2O_3$ | | | 0.5 | | 0.5 | | 1.3 | | | |
| | $R_2O$ | 12.5 | 11.0 | 14.0 | 13.0 | 11.5 | 13.0 | 14.8 | 13.0 | 12.0 | 11.0 |
| | R'O | 11.0 | 9.5 | 11.5 | 8.0 | 10.0 | 12.5 | 12.1 | 11.5 | 10.5 | 9.5 |
| | $Sb_2O_3$ | | | | | | | 0.1 | | | |
| | $Tb_2O_3$ | 5.5 | 5.5 | | | 8.5 | 3.0 | | 5.5 | 10.0 | 15.0 |
| | $Eu_2O_3$ | | | 4.0 | | | | | | | |
| | $Dy_2O_3$ | | | | 6.5 | | | | | | |
| | $Gd_2O_3$ | 2.5 | 7.5 | 3.0 | 4.0 | | 2.5 | | | | |
| | $Pr_2O_3$ | | | | | 1.0 | | | | | |
| Glass Composition Property | α [× $10^{-7}K^{-1}$] | 93.3 | 92.6 | 93.2 | 92.8 | 94.6 | 94.4 | 93.6 | 93.9 | 92.9 | 92.4 |
| | Glass Transition Temp. [° C.] | 508 | 512 | 508 | 512 | 510 | 503 | 498 | 502 | 510 | 619 |
| | Softening Temp. [° C.] | 691 | 686 | 684 | 588 | 683 | 674 | 665 | 870 | 681 | 698 |
| | Working Temp. [° C.] | 989 | 996 | 998 | 1030 | 1018 | 979 | 1020 | 977 | 995 | 999 |
| | Alkali Elution [mg] | 0.2 | 0.2 | 0.3 | 0.2 | 0.2 | 0.2 | 0.2 | 0.2 | 0.3 | 0.2 |
| Lamp Property | Luminous Flux [lm] | 1530 | 1535 | 1535 | 1535 | 1550 | 1520 | 1470 | 1500 | 1515 | 1410 |
| | Hazardous UV Radiation [μW/$cm^2$/1000 lx] | 0.01 | 0.01 | 0.01 | 0.01 | 0.01 | 0.01 | 0.03 | 0.02 | 0.01 | 0.01 |

Table 1 shows the glass compositions used for manufacturing the glass tubes of examples 1–6 and comparative examples 1–4.

To manufacture the glass tubes, each glass composition shown in Table 1 was put in a platinum crucible to be heated and melted for three hours at 1500° C. The resulting molten was then poured into a mold and left to stand for cooling to obtain the glass tube.

Property of Glass Composition:

The glass composition of each example and comparative example was measured for the thermal expansion coefficient α, glass transition temperature, softening temperature, working temperature, and alkali elution amount. The results are shown also in Table 1.

For the measurements, samples of 20 mm by 20 mm with a thickness of 2 mm were manufactured from each glass composition. The samples were irradiated with exciting light of 254 nm with radiant intensity of 0.4 mW/$cm^2$. The emission spectrum from each sample during the irradiation was measured with a multi channel photo detector.

Figure 3A:
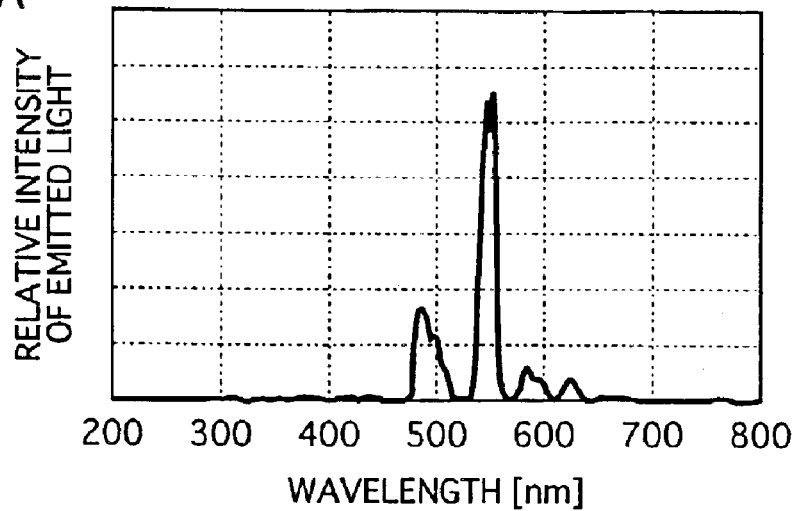
FIGS. 3A–3C are views showing emission spectra of glass compositions used, in a confirmatory test 1, to manufacture glass tubes respectively of examples 1 and 2 and a comparative example 3.
Figure 3B:
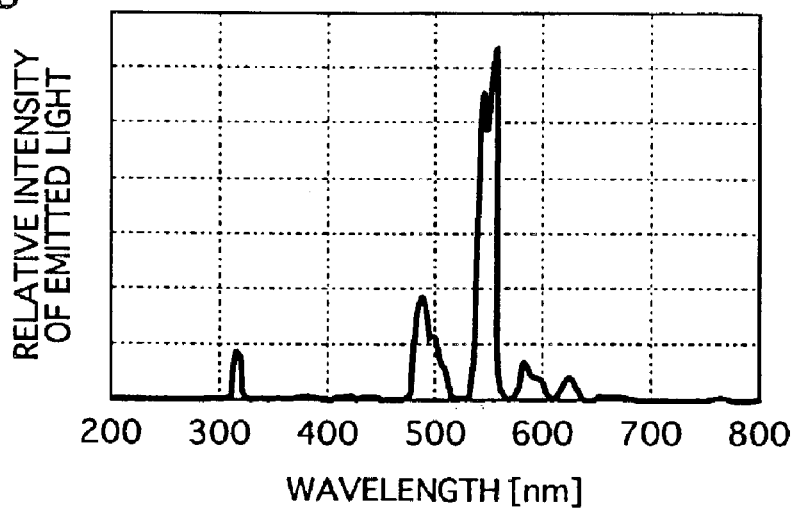
Figure 3C:
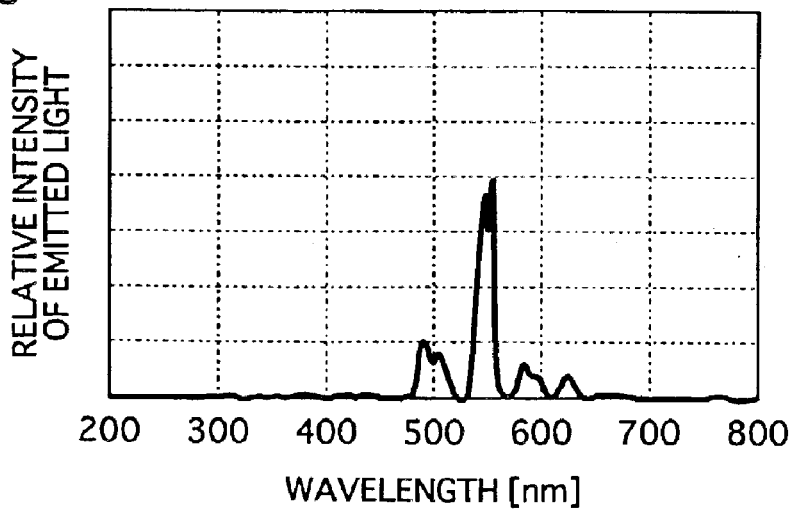

FIGS. 3A–3C show measurements results. Shown in FIG. 3A is the emission spectrum of the example 1, in FIG. 3B is of the example 2, and in FIG. 3C is of the comparative example 2.

According to the spectra, both the examples 1 and 2 emitted visible light of approximately equal intensity, and little emission was observed in the near ultraviolet region.

However, the spectrum of the comparative example shows that intensity of the visible light was lower than that of the example 1 and 2.

Measurement for Luminous Flux Value:

The fluorescent lamps of each example and comparative example were measured for their initial luminous flux values. The measurement results are shown also in Table 1. The initial luminous flux values were measured after each lamp was subjected to a life test for 100 hours.

Discussion:

Comparing each initial luminous flux value shown in Table 1, the comparative example 2 containing $Tb_2O_3$ exhibited a higher value than that of the comparative example 1. The examples 1–6 all exhibited a higher initial luminous flux value than that of the comparative example 2.

In addition, the examples 1, 2, 6 each containing $Gd_2O_3$ and $Tb_2O_3$ in the glass tube exhibited a higher initial luminous flux value than that of the comparative examples 2–4 each containing $Tb_2O_3$ as the only rare-earth oxide.

Especially notable is in comparison between the example 6 and the comparative examples 2 and 3. Although the content of rare-earth oxide was equal to or smaller than that of the comparative example 2 or 3, the example 6 exhibited a higher initial luminous flux value.

The above results confirm that the presence of both the first rare-earth oxide and the second rare-earth oxide in the glass composition leads to higher luminous efficiency than that of the glass composition containing the second rare-earth oxide without the first rare-earth oxide.

Further, comparing the example 1 and the example 2, the example 2 exhibited an initial luminous flux value that was slightly higher. This is ascribable to that the $Gd_2O_3$ content was higher in the example 2 than in the example 1. Yet, the example 1 with the lower $Gd_2O_3$ content is more advantageous in view of manufacturing cost.

Still further, the comparative example 4 exhibited an initial luminous flux value that was lower than that of the comparative examples 1–3. This is ascribable to concentration quenching caused by too much $Tb_2O_3$ contained in the glass composition.

Measurement for Hazardous Ultraviolet Radiation:

The fluorescent lamps of each example and comparative example were subjected to measurements for hazardous ultraviolet radiation. The measurements were performed in compliance with the common rules for safety test of lighting products by JEL 601. The results were shown also in Table 1.

All the examples and the comparative examples radiated hazardous ultraviolet radiation of 0.1 $\mu W/cm^2/1000lx$ or less. Yet, the amount of hazardous ultraviolet radiation was smaller in the examples than in the comparative examples.

Besides the glass compositions shown in Table 1, some other glass compositions were measured to confirm that any glass composition containing an arbitrary selected first rare-earth oxide ($Gd_2O_3$, $Tb_2O_3$, or $Pr_2O_3$) and an arbitrary selected second rare-earth oxide ($Eu_2O_3$, $Tb_2O_3$, $Dy_2O_3$, or $Nd_2O_3$) exhibited higher luminous flux than that by a glass composition containing the second rare-earth oxide without the first rare-earth oxide.

[Embodiment 2]

A fluorescent lamp according to an embodiment 2 of the present invention is basically similar in construction to the fluorescent lamp 10 of the embodiment 1. The difference lies in the composition of the glass tube 11 and the composition of the electrode glass. Hereinafter, description of the present embodiment is given mainly to the difference.

The glass tube 11 employed in the present embodiment is manufactured from the glass composition containing the following components.

$SiO_2$: 68.5 wt %
$Al_2O_3$: 2.0 wt %
$R_2O$: 14.0 wt % (where R is at least one element selected from Li, Na, and K)
R'O: 10.0 wt % (where R' is at least one element selected from Mg, Ca, Sr, Ba, and Zn)
$Eu_2O_3$: 5.5 wt %

The electrode glass 17 is manufactured from the glass composition containing the following components.

$SiO_2$: 62.5 wt %
$Al_2O_3$: 1.0 wt %
$R_2O$: 7.5 wt % (where R is at least one element selected from Li, Na, and K)
R'O: 5.5 wt % (where R' is at least one element selected from Mg, Ca, Sr, Ba, and Zn)
PbO: 18.0 wt %
$Eu_2O_3$: 5.5 wt %

Note that among the above components contained in the glass tube 11 or in the electrode glass 17, $Eu_2O_3$ is contained as a luminescent component.

In addition, the $Al_2O_3$ content in each glass composition is 1.0 or 2.0 wt %. The presence of $Al_2O_3$ serves to prevent $Eu_2O_3$, which is a rare-earth oxide, to be localized in the glass. In other words, $Al_2O_3$ is added to the glass composition to eliminate reduction in luminance due to localization of the rare-earth oxide. A preferable content to this effect is at least 1 wt %.

(Light Emission Mechanism of Fluorescent Lamp 10 of Embodiment 2)

Figure 4:
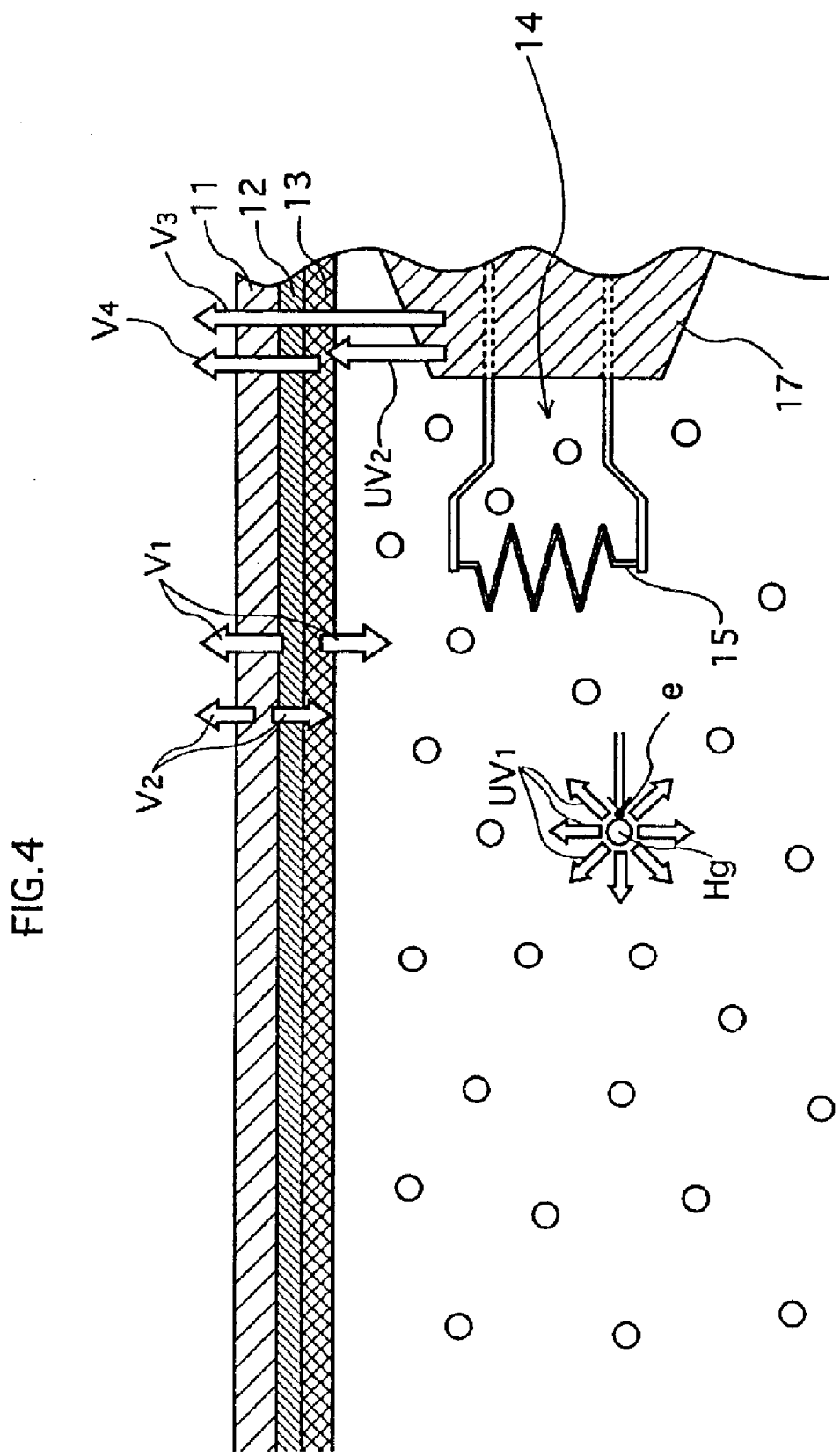
FIG. 4 is a schematic view showing light emission mechanism of a fluorescent lamp according to an embodiment 2 of the present invention.

Now, description is given to the light emission mechanism of the fluorescent lamp 10 according to the present embodiment with reference to FIG. 4.

As shown in FIG. 4, the present embodiment is similar to the embodiment 1 in the conversion mechanism of ultraviolet radiation to visible light that takes place in the glass tube 11. It should be noted, however, the glass composition according to the present embodiment contains a single rare-earth oxide ($Eu_2O_3$), as will be later described. Yet, since the glass composition also contains $Al_2O_3$, localization of the rare-earth oxide is prevented. As a consequence, similarly to the fluorescent lamp of the embodiment 1, the fluorescent lamp of the present embodiment is capable of keeping high luminous flux.

$Eu_2O_3$ contained in the glass tube 11 as mentioned above adsorbs nearly no visible light, and is uniformly dissolved in the glass composition that is used for manufacturing the glass tube 11. With such property, $Eu_2O_3$ does not block visible light to pass through the glass tube 11 toward outside the fluorescent lamp 10.

In addition, the electrode glass 17 of the present embodiment contains a luminescent component as specified above, so that a similar effect to the glass tube 11 is achieved.

As shown in FIG. 4, since the electrode glass 17 contains a luminance component of $Gd_2O_3$, ultraviolet radiation UV1 is converted to near ultraviolet radiation UV2 and to visible light V3. The thus converted visible light V3 is radiated toward outside the lamp, while the thus converted near ultraviolet radiation UV2 is converted by the phosphor layer 13 to visible light V4. The thus converted visible light V4 is then radiated toward outside the lamp.

Note that although in the embodiment 2, $Eu_2O_3$ is contained in the glass composition as a luminescent component, it may be at least one oxide of any element selected from Pr, Nd, Gd, Tb, and Dy. For example, when $Gd_2O_3$ is contained as a luminescent component in the glass composition, ultraviolet radiation that remains unconverted to visible light by the phosphor layer 13 is converted to near ultraviolet radiation (having a wavelength of 254 nm or longer) by the glass tube 11. Part of the thus converted near ultraviolet radiation is reflected back to the phosphor layer 13 to excite the phosphor particles. As a consequence, more visible light is generated and radiated toward outside the lamp.

(Components of Glass Composition)

The above description mainly explains the effect obtained by adding $Eu_2O_3$ to the glass composition, and the following describes effects achieved by other components contained in the glass composition.

Among the components of the glass composition, the $Al_2O_3$ content in the glass tube 11 is 2 wt % and 1 wt % in the electrode glass 17. The presence of $Al_2O_3$ serves to disperse a rare-earth element in the glass. To be more specific, since Al carries trivalent positive discharge, it is bound to oxygen in the glass, thereby forming a tetrahedral geometry carrying negative monovalent charge (substitution for Si carrying tetravalent positive discharge). The negative monovalant charge is coordinated to surround the rare-earth element so that the rare-earth element is dispersed.

Note that a similar effect is achieved by the presence of at least 1 wt % of $B_2O_3$ instead of $Al_2O_3$.

For the sake of dispersibility of the rare-earth element, it is required that the glass composition contain at least either of $Al_2O_3$ or $B_2O_3$ in the amount of at least 1 wt %.

Turning now to $R_2O$ and R'O, these components achieve an effect of shifting ultraviolet absorption edge to a longer wavelength. The absorption edge used herein refers to a marine of wavelength up to which the glass blocks ultraviolet radiation incident thereto.

In short, $R_2O$ and R'O serve to improve ultraviolet absorption of the rare-earth element contained in the glass, so that emission of hazardous ultraviolet radiation is suppressed.

Note that the above effect is more notable when each content of $R_2O$ and R'O is at least 3 wt %.

The electrode glass 17 contains PbO for attaining electric insulation, and the PbO content is at least 1 wt % for satisfactory achieving this effect. It should be noted, however, when the PbO content exceeds 40 wt %, viscosity of the glass decreases to the extent that there is adverse influence on the workability. Thus, the PbO content needs to be within a range of 1 to 40 wt %.

The glass tube 11 described above contains, as the luminescent component, a rare-earth oxide of $Eu_2O_3$. Alternatively, however, the grass tube 11 may contain a rare-earth oxide other than $Eu_2O_3$. Examples of such a rare-earth oxide include La, Ce, Pr, Nd, Sm, Gd, Tb, Dy, Ho, Er, Tm, Yb, and Lu. Especially suitable among the examples named above are Pr, Nd, Eu Gd, Tb, and Dy for excellent visible light conversion efficiency. In this case, similarly to the above $Eu_2O_3$ content, the content of the rare-earth oxide needs to be within a range of 0.01 to 30 wt % of the glass.

Further, although in the embodiment 1, the content of a rare-earth element in the glass composition is described to be 5.5 wt %, the content within a range of 0.01 to 30 wt % achieves a similar effect to the above.

[Embodiment 3]

Figure 5:
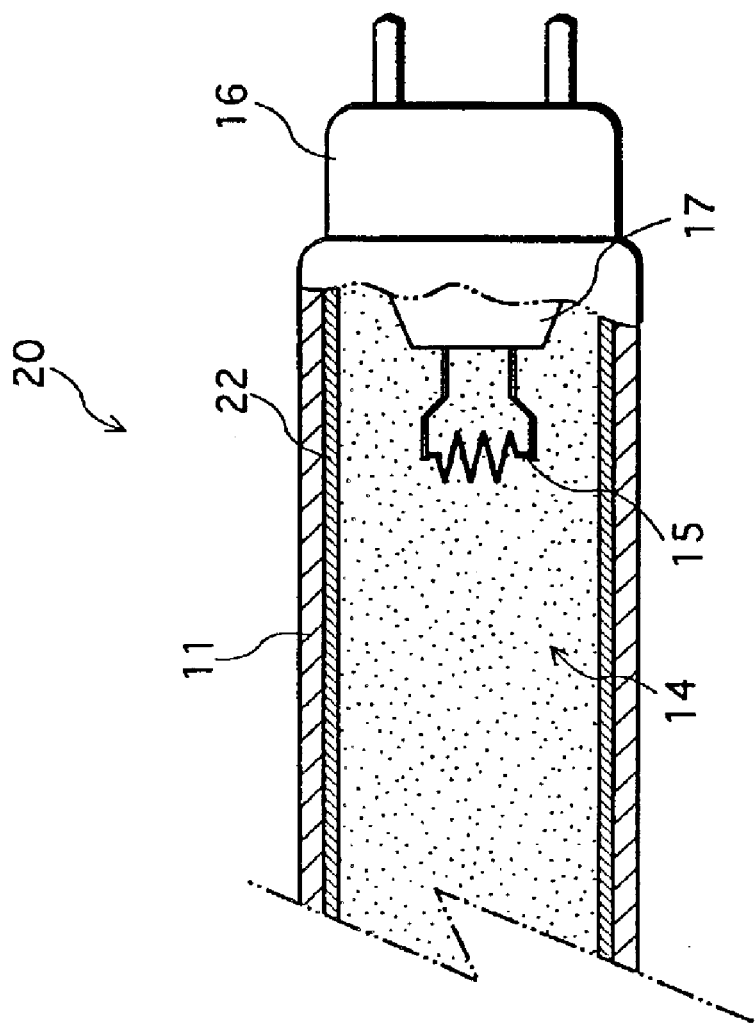
FIG. 5 is a side view (partially sectioned) of a fluorescent lamp according to an embodiment 3 of the present invention.

Now, description is given to a fluorescent lamp 20 according to an embodiment 3 of the present invention with reference to FIG. 5.

As shown in FIG. 5, the fluorescent lamp 20 is basically similar in construction to the fluorescent lamp 10 according to the embodiment 1. Unlike the fluorescent lamp 10, however, the inner surface of a protective layer 22 is not covered with a phosphor layer. Preferably, the thickness of the protective layer 22 is within a range of 0.01–1 μm.

The protective layer 22 contains a rare-earth oxide. Specifically, the protective layer 22 contains, as a main component, at least one selected from $SiO_2$, $\alpha$-$Al_2O_3$, $\gamma$-$Al_2O_3$, $TiO_2$, ZnO, $B_2O_3$, $Sc_2O_3$, $Y_2O_3$, MgO, and $Cs_2O$. Additionally, the protective layer contains $M_2O_3$ (where M is at least one selected from Pr, Nd, Eu, Gd, Tb, and Dy) in an amount of 0.01 to 30 wt %.

In the figure, the same references are used to denote parts similar to those of the fluorescent lamp 10. Description of the similar parts is omitted as it will be a repetition of the description given to the fluorescent lamp 10.

With the protective layer 22 containing the rare-earth oxide, the fluorescent lamp 20 does not require that the protective layer 22 be covered with a phosphor layer. It is because the glass tube 11 and the protective layer 22 manage to convert ultraviolet radiation generated in the discharge space to visible light, whereby the fluorescent lamp 20 emits visible light. The protective layer 22 emits light in a similar mechanism to the above-described mechanism of excitation light emission that takes place in the glass tube 11.

Since the fluorescent lamp 20 has no phosphor layer, no Hg is consumed by the reaction with phosphor. In addition, there is no need of performing a manufacturing step to sinter a phosphor layer, which eliminates the possibility that impurity gas is unintentionally sealed within the discharge tube in the manufacturing step.

In addition, the fluorescent lamp 20 with no phosphor layer is advantageous in cost as it saves cost for manufacturing steps and for material of a phosphor layer.

It should be appreciated that the fluorescent lamp of the present embodiment may be provided with a phosphor layer as per conventional practice. In this case, the phosphor layer is excited to emit visible light upon exposure to ultraviolet radiation of 254 nm, and also upon exposure to near ultraviolet radiation. Since the glass tube 11 and the protective layer 22 emits near ultraviolet radiation upon excitation, and part of the near ultraviolet radiation that is emitted toward the discharge space reaches the phosphor layer, luminous efficiency of the lamp is further improved with provision of the phosphor layer.

[Embodiment 4]

In an embodiment 4, description is given to a case where the present invention is applied to an HID lamp and to an incandescent lamp.

Figure 6:
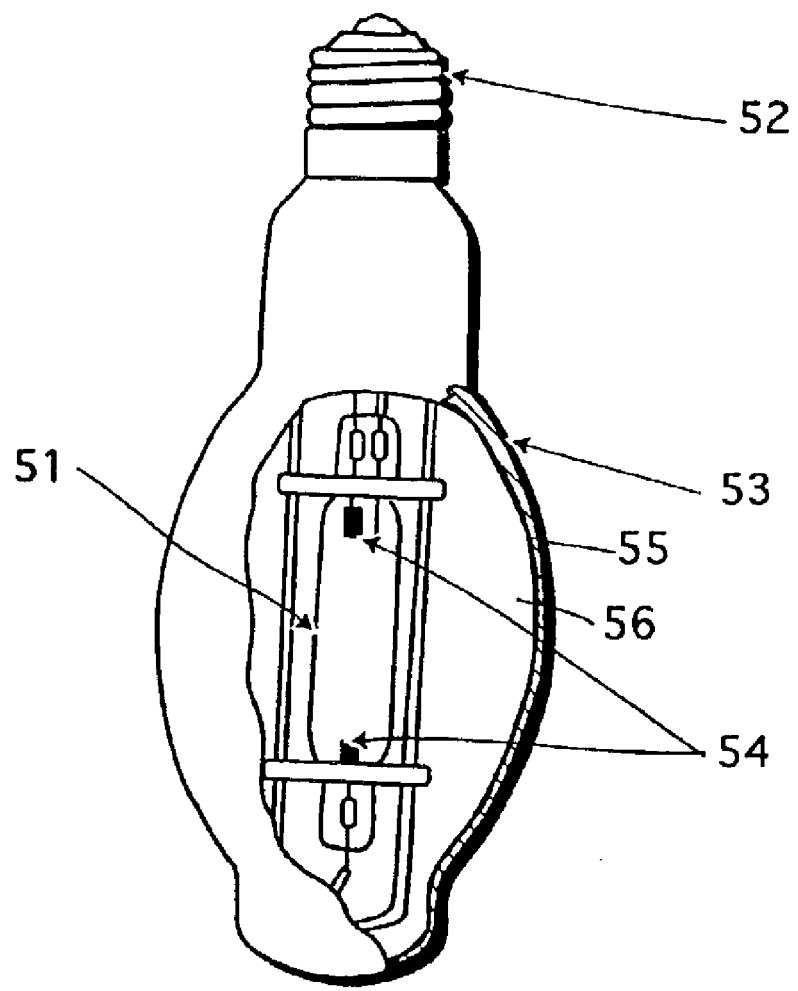
FIG. 6 is a side view (partially sectioned) of a mercury fluorescent lamp according to an embodiment 4 of the present invention.

FIG. 6 is a view showing an example of a mercury fluorescent lamp.

The mercury fluorescent lamp is a type of a high-pressure mercury lamp, and is composed of, as shown in the figure, a discharge tube 51, a base 52, and an envelope 53, for example.

The discharge tube 51 is made of transparent quartz glass, and provided with an electrode 54 at each end. In addition, the discharge tube 51 is filled with mercury and an argon gas.

The envelope 53 is composed of a glass tube enclosing the discharge tube 51 therein and having an inner surface coated with a phosphor layer 56.

The discharge tube 51 emits visible light upon discharge generated in mercury vapor under a high-pressure (100 to 1000 kPa). In addition to the visible light, the discharge tube 51 emits ultraviolet radiation. Excited by the ultraviolet radiation, the phosphor layer 56 in the envelope 52 is excited to emit visible light.

The glass tube 55 constituting the envelope 53 is made from borosilicate glass, and contains, similarly to the embodiment 1 described above, the first rare-earth oxide and the second rare-earth oxide.

With this arrangement, the envelope 53 achieves an effect similar to that achieved by the fluorescent lamp 10 of the embodiment 1.

To be more specific, part of the ultraviolet radiation emitted from the discharge tube 51 passes through the phosphor layer 56 to reach the glass tube 55. The first rare-earth oxide and the second rare-earth oxide contained in the glass tube 55 convert the ultraviolet radiation to visible light with efficiency.

With the above-stated effect, the mercury fluorescent lamp realizes excellent luminous efficiency.

In the above description, the mercury fluorescent lamp is composed of the envelope 53 that is provided with the phosphor layer 56. Yet, such excellent luminous efficiency is realized also by a high-pressure mercury lamp composed of an envelope without a phosphor layer. To this end, the envelope is manufactured from the glass composition containing the above-stated first rare-earth oxide and second rare-earth oxide.

Regarding Metal Halide Lamp and High-Pressure Sodium Lamp:

Similarly to the mercury fluorescent lamp described above, a metal halide lamp is composed of a discharge tube made of transparent quartz glass, an envelope made of borosilicate glass, and the like. The difference lies in that the discharge tube is filled with metal halide (for example, scandium (Sc) halide and sodium (Na) halide) as a luminescent component, a rare gas as a starting aid, and mercury as a buffer gas. The buffer gas serves to maintain suitable electric characteristics and arc discharge at optimum temperatures. Further, the envelope is not provided with a phosphor layer.

The metal halide lamp as stated above generates luminous flux fundamentally in the following mechanism. That is, discharge generated in the discharge tube dissociates the metal halide into metal atoms and halogen atoms, and the metal atoms are excited to emit visible light.

Upon discharge, the discharge tube also emits ultraviolet radiation. Thus, the presence of the first rare-earth oxide and the second rare-earth oxide in the envelope serves to convert the ultraviolet radiation into visible light, so that more luminous flux is generated. As a result, luminous efficiency of the lamp improves.

A high-pressure sodium lamp is composed of, for example, a discharge tube made of polycrystalline alumina ceramics, and an envelope made of soda glass. The discharge tube is filled with sodium as a luminescent component, a xenon gas as a starting aid, and mercury as a buffer gas. The envelope is not provided with a phosphor layer.

The high-pressure sodium lamp as stated above generates luminous flux fundamentally in the following mechanism. That is, discharge generated in sodium vapor present in the discharge tube 71 results in emission of visible light so that luminous flux is generated. At this stage, the discharge tube radiates ultraviolet radiation although the amount is slight. Thus, the presence of the first rare-earth oxide and the second rare-earth oxide in the envelope serves to convert ultraviolet radiation to visible light, so that more luminous flux is generated. As a result, luminous efficiency of the lamp increases.

Application to Incandescent Lamp:

Typical incandescent lamps include general-purpose illumination lamps and halogen lamps.

A general-purpose illumination lamp is composed of a bulb made of soft soda glass or of hard borosilicate glass. The bulb is filled with an inert gas (such as nitrogen, argon, or krypton) and is provided with lead-in wires and electrodes made of a tungsten filament.

Generally, a halogen lamp is composed of a bulb made of quartz. The bulb is filled with an inert gas and a halogen material, and is provided with lead-in wires and electrodes made of a tungsten filament.

An incandescent lamp of as stated above generates luminous flux fundamentally in the following mechanism. That is, when electric current is applied to the electrodes as in a conventional manner, the temperature of the filament rises high so that visible light is emitted. The thus emitted light also includes a slight amount of ultraviolet radiation.

Consequently, the presence of the first rare-earth oxide and the second rare-earth oxide named in the embodiment 1 serves to convert the ultraviolet radiation into visible light, so that more luminous flux is generated. As a result, luminous efficiency of the lamp increases.

[Modification 1]

The glass composition used for manufacturing the glass tube 11, the electrode glass 17, the envelope 53 are in no way limited to the specific compositions disclosed in the above embodiments 1–4. For example, alternatively to $Al_2O_3$ employed in the embodiment 2, $B_2O_3$ maybe used to prevent localization of the rare-earth oxide. However, it is desirable for imparting suitable properly that the glass composition contain the following components each within the specified range.

$SiO_2$: 60–75 wt %
$Al_2O_3$: 1–5 wt %
$B_2O_3$: 0–5 wt %
$R_2O$: 3–30 wt % (where R is at least one element selected from Li, Na, and K)
R'O: 3–20 wt % (where R' is at least one element selected from Mg, Ca, Sr, Ba, and Zn)
$M_2O_3$: 0.01–30 wt % (where M is at least one element selected from Pr, Nd, Eu, Gd, Tb, Dy)

With the glass composition containing the specified components in the specified amount, an effect similar to that of the embodiments 1–3 is achieved.

Further, alternatively to the glass composition employed in the embodiment 4, the envelope of an HID lamp may be made of the glass composition containing the components specified below in the specified amount.

$SiO_2$: 75–98.7 wt %
$Al_2O_3$: 0.1–3 wt %
$B_2O_3$: 0.1–3 wt %
$R_2O$: 0.1–3 wt % (where R is at least one element selected from Li, Na, and K)
$M_2O_3$: 0.01–30 wt % (where M is at least one element selected from Pr, Nd, Eu, Gd, Tb, and Dy)

The glass composition specified above is desirable because higher heat resistance and transparency are required for the envelope of an HID lamp than for the glass tube of a fluorescent lamp. The higher $SiO_2$ content serves to ensure excellent heat resistance and transparency.

Further, for the envelope of an HID lamp, such as a mercury lamp, the following glass composition may be employed.

$SiO_2$: 55–85 wt %
$Al_2O_3$: 1–8 wt %
$B_2O_3$: 5–20 wt %
$R_2O$: 0–10 wt % (where R is at least one element selected from Li, Na, and K)
R'O: 0–10 wt % (where R' is at least one element selected from Mg, Ca, Sr, Ba, and Zn)
$M_2O_3$: 0.01–30 wt % (where M is at least one element selected from Pr, Nd, Eu, Gd, Tb, and Dy)

To confirm the effects stated above, following tests were conducted.

[Confirmatory Test 2]
(Test 2-1)

In order to conduct the tests, eight types of glass composition samples were prepared as examples 7–10 and comparative examples 5–8, and measured for their characteristic values. Each glass composition had a suitable property to be used to form a connecting portion of the discharge tube to the lead glass.

Each sample was then used to manufacture a glass tube of a 20 W straight type fluorescent lamp. The thus prepared fluorescent lamps were then measured for the luminous flux.

Table 2 shows the components of each glass composition and the measurement results.

indices of melt-fabricablity of the glass. For the use as a connecting portion of the glass tube to lead glass, it is preferable that the glass transition temperature fall within the range of 450–550 [° C.], the softening temperature fall within the range of 600–700 [° C.], and the working temperature be 1100 [° C.] or less (for example, within the range of 950–1050 [° C.]).

As shown in Table 2, all the samples exhibited the three temperatures each within the preferable range for such a use in view of melt-fabricablity.

The amount of alkali elution shown in Table 2 was measured in compliance with JIS R3502. In order to prevent reduction in light emission performance of a lamp, a smaller amount of alkali elution is preferred.

TABLE 2

(Unit: wt %)

| | Example 7 | Example 8 | Example 9 | Example 10 | Comparative Example 5 | Comparative Example 6 | Comparative Example 7 | Comparative Example 8 |
|---|---|---|---|---|---|---|---|---|
| $SiO_2$ | 68.5 | 68.5 | 68.6 | 68.7 | 72.0 | 69.5 | 69.0 | 69.0 |
| $Al_2O_3$ | 2.0 | | 1.0 | | | | 0.9 | |
| $B_2O_3$ | | 2.0 | | 1.0 | | | | 0.9 |
| $R_2O$ | 14.0 | 14.0 | 13.7 | 13.5 | 16.0 | 14.5 | 14.3 | 14.3 |
| R'O | 10.0 | 10.0 | 10.2 | 11.0 | 12.0 | 10.5 | 10.3 | 10.3 |
| $Eu_2O_3$ | 5.5 | 5.5 | 6.5 | 5.8 | | 5.5 | 5.5 | 5.5 |
| $\alpha$ [$\times 10^{-7} K^{-1}$] | 93.8 | 93.2 | 94.2 | 94.9 | 96.2 | 95.2 | 93.8 | 93.7 |
| Glass Transition Temp. [° C.] | 506 | 488 | 478 | 485 | 475 | 501 | 504 | 499 |
| Softening Temp. [° C.] | 671 | 660 | 656 | 662 | 654 | 681 | 678 | 674 |
| Working Temp. [° C.] | 980 | 970 | 950 | 959 | 956 | 986 | 982 | 979 |
| Alkali Elution [mg] | 0.2 | 0.2 | 0.3 | 0.2 | 0.3 | 0.2 | 0.2 | 0.2 |
| Luminous Flux [lm] | 1520 | 1530 | 1520 | 1530 | 1460 | 1480 | 1480 | 1480 |

As shown in Table 2, all the glass compositions except the glass composition of the comparative example 5 contained $Eu_2O_3$.

The glass composition of the comparative example 6 contained neither $Al_2O_3$ nor $B_2O_3$, while the glass compositions of the comparative examples 7 and 8 each contained either 0.9 wt % of $Al_2O_3$ or $B_2O_3$.

All the glass compositions were prepared commonly in the following manner. First, each component was mixed and the mixture was put in a platinum crucible to be heated and melted (at 1500 [° C.] for three hours) in an electric furnace. The resulting molten was then poured into a metal mold and left to stand for cooling.

Similarly to the above confirmatory test 1, the thermal expansion coefficient α shown in Table 2 was measured at temperatures of 30–380° C. in compliance with JIS R3102. All the samples exhibited a thermal expansion coefficient α that fell within the range of 90×10⁻⁷ to 100×10⁻⁷ [K⁻¹], which appeared to meet a requirement for a lamp stem. The range stated above is defined so as to be equal to a thermal expansion coefficient of a Dumet wire (a wire of Ni—Fe alloy coated by Cu) used to supply power to the electrodes disposed inside the lamp.

Further, the glass transition temperature, softening temperature, and working temperature shown in Table 2 were measured under the same condition as that of the confirmatory test 1 stated above. Theses values serve as As shown in Table 2, all the samples eluted alkali in the amount within the range of 0.2–0.3 [mg]. In other words, there was no substantial difference observed in alkali elution between the examples and the comparative examples.

The luminous flux value was obtained by measuring initial luminous flux of each fluorescent lamp (after 100 hours of lamp operation).

As shown in Table 2, the fluorescent lamps respectively employing the glass compositions of the examples 7–10 emitted high luminous flux of 1520 to 1530 [lm], while the lamps of the comparative examples 5–8 emitted low luminous flux of 1480 [lm] or lower. This is ascribable as follows. Each glass composition of the examples 7–10 contained, in addition to a rare-earth oxide, either $Al_2O_3$ or $B_2O_3$ in the amount of 1 wt % or greater. In contrast, the glass composition of the comparative example 1 contained no rare-earth oxide. Further, although containing a rare-earth oxide, the comparative examples 6–8 contained neither $Al_2O_3$ nor $B_2O_3$ at all or contained either of the two only in the amount less than 1 wt %. In short, the results shown in Table 2 confirm that the presence, in a glass composition, of $Al_2O_3$ or $B_2O_3$ not less than 1 wt % serves to prevent localization of the rare-earth oxide, whereby the rare-earth oxide acts sufficiently well as a luminous component. It is also confirmed that the above effect is not achieved when the content of $Al_2O_3$ or of $B_2O_3$ is less than 1 wt %.

As described above, owing to the presence of a rare-earth oxide together with 1 wt % or greater amount of either $Al_2O_3$ or $B_2O_3$, each glass composition of the examples 7–10 was capable of converting ultraviolet radiation to visible light or to near ultraviolet radiation with efficiency. At the same time, the examples 7–10 maintained as good physical properties as those of the comparative examples 5–8 in view of requirements to be used as a connection portion of a glass tube to lead glass.

(Test 2-2)

Table 3 shows the glass compositions subjected to the test 2-2.

TABLE 3

(Unit: wt %)

|  | Example 11 | Example 12 | Example 13 | Comparative Example 9 |
|---|---|---|---|---|
| $SiO_2$ | 78.0 | 80.0 | 75.0 | 76.0 |
| $Al_2O_3$ | 1.5 | 2.0 | 2.0 | 1.0 |
| $B_2O_3$ | 11.0 | 7.5 | 12.0 | 16.0 |
| $R_2O$ | 3.5 | 5.0 | 2.0 | 6.0 |
| R'O | 1.0 | 1.0 | 4.0 | 1.0 |
| $Tb_2O_3$ | 5.0 | | | |
| $Eu_2O_3$ | | 4.5 | | |
| $Gd_2O_3$ | | | 5.0 | |
| α $[\times 10^{-7} K^{-1}]$ | 38.6 | 39.6 | 37.6 | 38.0 |
| Glass Transition Temp. [° C.] | 568 | 574 | 538 | 545 |
| Softening Temp. [° C.] | 792 | 799 | 765 | 778 |
| Working Temp. [° C.] | 1184 | 1189 | 1137 | 1148 |
| Alkali Elution [mg] | 0.3 | 0.2 | 0.3 | 0.2 |
| Luminance [cd/m$^2$] | 31500 | 30800 | 31900 | 29000 |

As shown in Table 3, sample of the examples 11–13 and the comparative example 9 all contained $B_2O_3$ that was 3 to 10 times higher than that contained in each sample used in the test 2-1. Further, each sample used in this test contained $R_2O$ that was only ½ to ⅐ of the $R_2O$ contained in each sample used in the test 2-1. The difference between the examples 5–7 and the comparative example 9 was whether a rare-earth oxide was contained. The sample of the example 11 contained 5.0 wt % of $Tb_2O_3$, the samples of the example 12 contained 4.5 wt % of $Eu_2O_3$, and the sample of the example 7 contained 5.0 wt % of $Gd_2O_3$.

The sample glass compositions were prepared in the same manner as the above test 2-1.

To measure the luminance shown in Table 3, a φ2.4 T type cold-cathode fluorescent lamp was manufactured from each glass composition of the examples 11–13 and the comparative example 9. The thus prepared fluorescent lamps were measured for the initial luminance (after 100 hours of lamp operation).

As shown in Table 3, the samples of the example 11–13 exhibited physical properties that were almost similar to those of the comparative example 9, and that satisfied requirements to be used as a discharge tube of a lamp. To be more specific, all the samples exhibited the thermal expansion coefficient α that fell within the range of $33 \times 10^{-7}$ to $43 \times 10^{-7}$ $[K^{-1}]$, the grass transition temperature that fell within the range of 500 to 600 [° C.], the softening temperature that fell within the range of 750 to 850 [° C.], and the working temperature of 1200 [° C.] or less (for example, within the range of 1100 to 1200 [° C.]).

As shown in Table 3, when comparing luminance of the cold-cathode fluorescent lamps each manufactured from the samples, the lamps of the examples 11–13 exhibited values that were 6 to 10% higher than that of the comparative example 9. In other words, the results confirm that the rare-earth oxide contained in the glass sufficiently acted as a luminescent component.

It is thus concluded that the glass compositions of the examples 11–13 were similar to the comparative example 9 in the physical properties required to be used as a discharge tube, and better than the comparative example 8 in the conversion efficiency to visible light or to near ultraviolet radiation.

(Test 2-3)

In the test 2-3, samples of glass of each composition were prepared for the use as electrode glass of a lamp. The samples were evaluated in terms of physical properties and lamp performance. Table 4 shows components contained in each glass composition together with the physical properties and the luminous flux emitted from the lamp.

TABLE 4

(Unit: wt %)

|  | Example 14 | Example 15 | Example 16 | Comparative Example 10 | Comparative Example 11 |
|---|---|---|---|---|---|
| $SiO_2$ | 60.3 | 61.4 | 62.5 | 62.0 | 58.5 |
| $Al_2O_3$ | 1.0 | 1.0 | 1.0 | 1.8 | 1.5 |
| $R_2O$ | 6.7 | 5.6 | 7.5 | 6.8 | 7.7 |
| R'O | 5.0 | 5.0 | 5.5 | 8.0 | 7.2 |
| PbO | 22.0 | 22.0 | 18.0 | 21.4 | 25.1 |
| $Eu_2O_3$ | 5.0 | 5.0 | 5.5 | | |
| α $[\times 10^{-7} K^{-1}]$ | 93.8 | 95.5 | 94.5 | 95.2 | 93.8 |
| Glass Transition Temp. [° C.] | 409 | 420 | 415 | 405 | 406 |
| Softening Temp. [° C.] | 650 | 652 | 655 | 638 | 646 |
| Working Temp. [° C.] | 953 | 956 | 960 | 956 | 986 |
| Alkali Elution [mg] | 0.2 | 0.2 | 0.2 | 0.3 | 0.2 |
| Electric Resistance [log(Ω · cm)] | 8.2 | 8.4 | 8.7 | 8.2 | 8.3 |
| Luminous Flux [lm] | 1520 | 1520 | 1530 | 1460 | 1480 |

The sample glass compositions were prepared in the same manner as the tests 2-1 and 2-2.

Further, for the measurement of the luminous flux, a 20 W straight-type fluorescent lamp was manufactured from each glass composition to measure the initial luminous flux of each lamp (after 100 hours of lamp operations).

As shown in Table 4, the only difference in composition between the examples 14–16 and the comparative examples 10 and 11 was whether a rare-earth oxide ($Eu_2O_3$) was contained.

Note that all the glass compositions subjected to the test 2-3 contained PbO in the amount of 18.0 to 25.1 wt %.

As shown in Table 4, each sample exhibited the physical properties as follows: the thermal expansion coefficient α that fell within the range of $93.5 \times 10^{-7}$ to $95.5 \times 10^{-7}$ [$K^{-1}$], the glass transition temperature that fell within the range 405 to 420 [° C.], the softening temperature that fell within the range of 638 to 655 [° C.], the working temperature that fell within the range of 953 to 986 [° C.], the alkali elution amount that fell within the range of 0.2 to 0.3 [mg]. All the physical properties met the values required for the use as electrode glass of a lamp. To be suitable as electrode glass of a lamp, a glass composition preferably exhibits the thermal expansion coefficient α that falls within the range of $90 \times 10^{-7}$ to $100 \times 10^{-7}$ [$K^{-1}$], the glass transition temperature that falls within the range 400 to 500 [° C.], the softening temperature that falls within the range of 600 to 700 [° C.], the working temperature of 1100 [° C.] or below (for example, within the range of 950 to 1050 [° C.]).

Further, the samples of the examples 14–16 each containing a rear-earth oxide exhibited the electric resistance that fell within the range of 8.2 to 8.7 [log (Ω·cm)], which did not substantially differ from that of the comparative examples 10 and 11.

Further, the luminous flux values of the lamps each manufactured from the glass compositions of the examples 14–16 all fell within the range of 1520 to 1530 [lm], which were apparently higher as compared with the comparative examples 10 and 11. The lamps of the comparative examples 10 and 11 exhibited the luminous flux values within the range of 1460 to 1480 [lm].

Accordingly, the following were confirmed. Used as electrode glass of a lamp, the glass compositions of the examples 14–16 exhibited similar physical properties to those of the comparative examples 10 and 11. In addition, as compared to the comparative examples 10 and 11, the glass compositions of the examples 14–16 exhibited better conversion efficiency to visible light or to ultraviolet radiation.

(Test 2-4)

In the test 2-4, glass composition samples were prepared for the use as an envelope of an HID lamp. The samples were evaluated in terms of physical properties and lamp performance. To conduct the test, a 250 w multi-halogen lamp was prepared from each glass composition. Table 5 shows the components contained in each sample together with measurement results of the physical properties and luminous flux emitted from the lamp.

TABLE 5

| | Example 17 | Example 18 | Example 19 | Comparative Example 12 |
|---|---|---|---|---|
| | | | | (Unit: wt %) |
| $SiO_2$ | 95.0 | 93.5 | 93.0 | 96.5 |
| $Al_2O_3$ | 0.4 | 0.4 | 0.5 | 0.5 |
| $B_2O_3$ | 0.7 | 1.5 | 1.0 | 3.0 |

TABLE 5-continued

| | Example 17 | Example 18 | Example 19 | Comparative Example 12 |
|---|---|---|---|---|
| | | | | (Unit: wt %) |
| $R_2O$ | 0.1 | 0.1 | 0.5 | |
| $Tb_2O_3$ | 3.8 | | | |
| $Eu_2O_3$ | | 4.5 | | |
| $Gd_2O_3$ | | | 5.0 | |
| Glass Transition Temp. [° C.] | 1012 | 989 | 970 | 1050 |
| Softening Temp. [° C.] | 1476 | 1442 | 1439 | 1530 |
| Alkali Elution [mg] | 0.3 | 0.2 | 0.3 | 0.2 |
| Luminous Flux [lm] | 16700 | 16600 | 17100 | 16000 |

As shown in Table 5, the glass compositions for the use as an envelope of an HID lamp were extremely higher in the $SiO_2$ content (93.0 to 95.0 wt %) than the glass compositions prepared in the tests 2-1, 2-2, and 2-3. This is because an HID lamp generates high heat at the time of operation and is required to have high capability of generating visible light. To this end, the glass composition for such a use preferably has the glass transition temperature within the range of 1100 to 1300 [° C.] and the softening temperature within the range of 1500 to 1700 [° C.].

As shown in Table 5, the samples of the examples 17–19 all exhibited the grass transition temperature that fell within the range of 970 to 1012 [° C.], and the softening temperature that fell within the range of 1439 to 1476 [° C.]. Thus, just as the comparative example 12, the examples 17–19 met the requirements as stated above to be used to manufacture an envelope of an HID.

The major difference in composition between the examples 17–19 and the comparative example 12 was whether a rare-earth oxide was contained.

As apparent from Table 5, the examples 17–19 containing the rare-earth oxide exhibited the luminous flux that fell within the range of 16600 to 17100 [lm], which was higher as compared to the comparative example that exhibited the luminous flux of 16000 [lm].

In other words, the glass compositions of the examples 17–19 each exhibited high conversion efficiency to visible light or to near ultraviolet radiation, while satisfying the requirements for the use as an envelope of an HID lamp.

(Test 2-5)

The test 2-5 was conducted to confirm the effect of a rare-earth oxide contained in a protective layer. The effect was evaluated in terms of performance of 20 W straight type lamps each provided with such a protective layer. Table 6 shows the results.

TABLE 6

(Unit: wt %)

| | Example 20 | Example 21 | Example 22 | Comparative Example 13 | Comparative Example 14 |
|---|---|---|---|---|---|
| $SiO_2$ | 94.5 | | 94.5 | 100.0 | |
| $Al_2O_3$ | | 94.5 | | | 100.0 |
| $Tb_2O_3$ | 5.5 | | | | |
| $Eu_2O_3$ | | 5.5 | | | |
| $Gd_2O_3$ | | | 5.5 | | |
| Luminous Flux At Start [lm] | 1510 | 1502 | 1513 | 1462 | 1458 |
| Luminous Flux After 2000 h [lm] | 1357 | 1367 | 1372 | 1288 | 1277 |
| Luminous Flux Maintenance Factor [%] | 89.9 | 91.0 | 90.7 | 88.1 | 87.6 |

As shown in Table 6, each protective layer of examples 20–22 contained a rare-earth oxide as an luminescent component. Contrary, the protective layer of the comparative example 13 contained $SiO_2$ alone, and the protective layer of the comparative example 14 contained $Al_2O_3$ alone.

Each sample of the examples 20–22 generated luminous flux of 1502 to 1513 [lm] at the time the lamp was first operated. The values were 2.7 to 3.8% better than 1458 to 1462 [lm] generated by the comparative examples 13 and 14.

Further, as shown in Table 6, each protective layer of the examples 20 to 22 exhibited luminous flux maintenance factor (a rate between luminous flux at the time of starting lamp operation and luminous flux after 2000 hours of lamp operation) of 89.9 to 91.0%, which was almost equal to, or slightly better as compared with the comparative examples 13 and 14.

In short, a protective layer containing a rare-earth oxide as in the examples serves to improve luminous efficiency of the lamp as compared with a protective layer without a rare-earth oxide. In addition, the improvement of the luminous efficiency is achieved without lowering suppression of the reaction between alkali metal in the glass and HG in the discharge space.

[Embodiment 5]

In the above embodiment 1, it is the glass tube 11 that contains the first rare-earth oxide together with the second rare-earth oxide. In the present embodiment, the fluorescent lamp 10 as shown in FIG. 1 is provided with the protective layer 12 containing the first rare-earth oxide together with the second rare-earth oxide.

The protective layer 12 of the present embodiment is manufactured in the following manner.

That is, the first-rare and the second rare-earth oxides are added to a powder material of a main component (a metal oxide selected from $SiO_2$, $\alpha$-$Al_2O_3$, $\gamma$-$Al_2O_3$, $TiO_2$, ZnO, $B_2O_3$, $Sc_2O_3$, $Y_2O_3$, MgO, and $Cs_2O$) of the protective layer 12. The mixture is then melted, followed by grinding to obtain a composite oxide powder. The resulting composite oxide powder is added to a solvent, such as water or an organic solvent (isopropyl alcohol), together with dispersant to obtain the mixture dispersed in liquid. The liquid is then applied onto an inner surface of the glass tube 11 with e.g., a spray method, and then dried and sintered to form the protective layer 12.

With the rare-earth oxides being dissolved in the main component material, the main component and the rare-earth oxides together form a composite oxide.

Note that the mixture powder may be applied to the inner surface of the glass tube 11 with a wet method as described above, or alternatively with an electrostatic coating method, or a sol-gel method using metal alkoxide dissolved in an organic solvent.

As described above, the protective layer 12 achieves its essential effect of improving luminous flux maintenance factor. In addition, the protective layer 12 achieves an effect of improving luminous efficiency by the presence of the first rare-earth oxide and the second rare-earth oxide.

To be more specific, similarly to the mechanism of the embodiment 1, part of ultraviolet radiation of 254 nm generated upon discharge passes through the phosphor layer 13 to irradiate the protective layer 12. In response, the first rare-earth oxide and the second rare-earth oxide contained in the protective layer 12 convert the ultraviolet radiation to visible light, thereby improving overall conversion efficiency. Consequently, the luminous efficiency of the lamp improves.

In addition, dissolved in the main component material, the first and the second rare-earth oxides have no adverse influence on visible light transmittance of the protective layer 12.

To obtain a greater amount of visible light, it is preferred that the contents of first rare-earth oxide and of the second rare-earth oxide each fall within the range of 0.01 to 30 wt %.

Note that luminous efficiency is further improved when both the protective layer 12 and the glass tube 11 contain the first and the second rare-earth oxides because the rare-earth oxides contained in the glass tube 11 serve to generate extra luminous flux.

[Embodiment 6]

In the above embodiment 1, it is the glass tube 11 of the fluorescent lamp 10 that contains the first and the second rare-earth oxides. In the present embodiment, the first and the second rare-earth oxides are contained in a binder used to form the phosphor layer 13.

To be more specific, the phosphor layer of the present embodiment is formed of tri-band phosphor particles bound together by the binder containing, as a main component material, a mixture of (1) a compound formed by calcium oxide, barium oxide, and boron oxide, and (2) calcium pyrophosphate.

The binder additionally contains one of the above first rare-earth oxides and one of the above second rare-earth oxides both dissolved in the main component material.

There are some possible alternatives to the main component of the binder. Rather than a mixture of (1) a compound formed by calcium oxide, barium oxide, and boron oxide, and (2) calcium pyrophosphate as specified above, the main component may be either a compound formed by calcium oxide, barium oxide, and boron oxide. Alternatively, the main component maybe be solely of aluminum oxide. In another alternative, the main component may be a mixture of aluminum oxide and calcium pyrophosphate.

It is preferable that the amount of binder added to the phosphor layer 13 be within the range of 0.001 to 10 wt % of the phosphor particles.

Similarly to the embodiment 1, the above-described phosphor layer 13 generates visible light V1 upon excitation of the phosphor particles by ultraviolet radiation UV1. The thus generated visible light V1 constitutes most of the luminous flux emitted from the fluorescent lamp 10.

Further, in this embodiment, part of the ultraviolet radiation UV1 generated upon discharge is converted to visible light by the first rare-earth oxide and the second rare-earth oxide contained in the binder. That is to say, the overall ultraviolet radiation is more effectively converted to visible light, so that luminous efficiency improves.

In order for a higher efficiency of the conversion into visible light, it is preferable that each content of the first rare-earth oxide and the second rare-earth oxide in the binder fall within the range of 0.01 to 30 wt %.

The phosphor layer 13 as described above is manufactured in the following manner.

First, the above-described main component material is mixed with the first rare-earth oxide and the second rare-earth oxide. The mixture is then dissolved and formed to obtain binder.

Phosphor particles and the thus obtained binder are dispersed in a binder-containing solvent to prepare dispersion liquid.

The thus prepared dispersion liquid is then applied on the protective layer 12 of the glass tube 11, dried, and sintered to form the phosphor layer 13.

[Embodiment 7]

Figure 7:
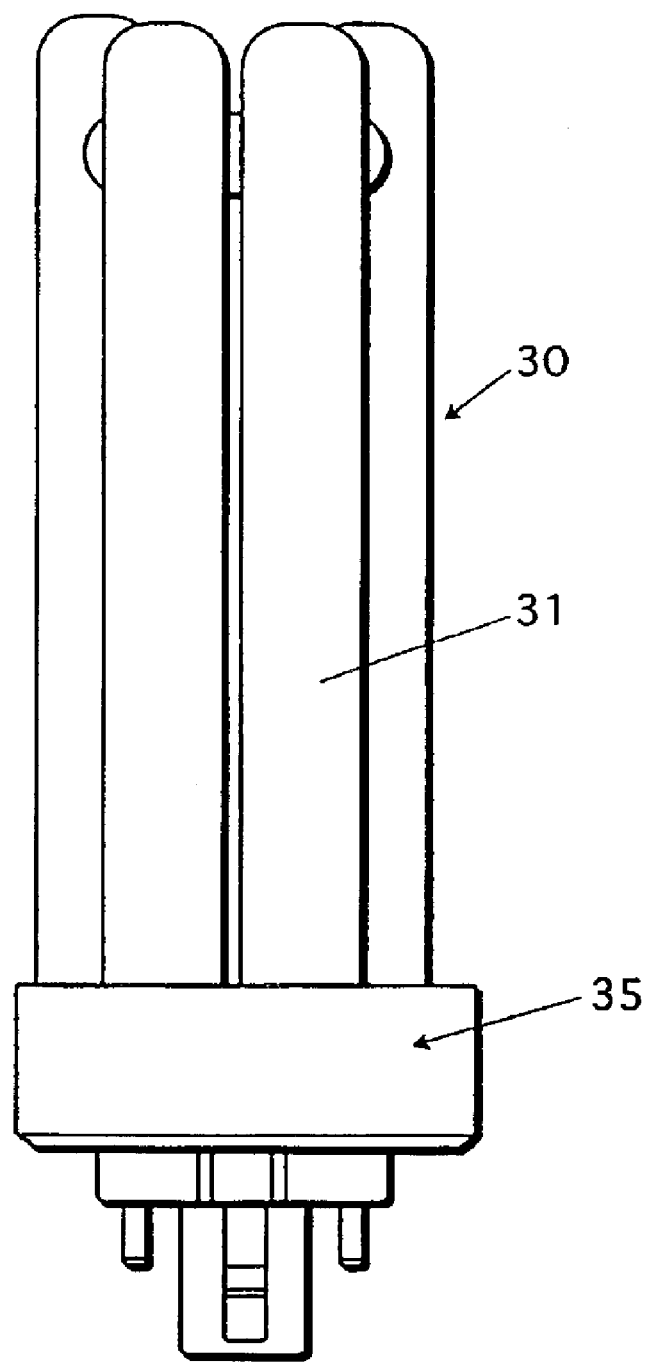
FIG. 7 is view showing the external representation of a compact-type fluorescent lamp according to an embodiment 7 of the present invention.

FIG. 7 is a view showing the external representation of a compact-type fluorescent lamp according to an embodiment 7 of the present invention.

The fluorescent lamp is composed of a discharge vessel 30 fixedly attached to a base 35. The discharge vessel 30 is composed of six straight glass tubes (glass bulbs) 31 each of which has an inner surface coated with a phosphor layer 32 (not illustrated in FIG. 7).

Each of the six glass tubes 31 is bridge-connected to an adjacent one at their ends so as to form a single discharge space throughout all the glass tubes. The discharge space is filled with a rare-gas, such as argon, and mercury.

Further, the discharge vessel 30 is provided with an electrode (not illustrated) at each end of the discharge space.

Provided inside the base 35 is a lighting circuit (not illustrated) for lighting the discharge vessel 30.

Figure 8:
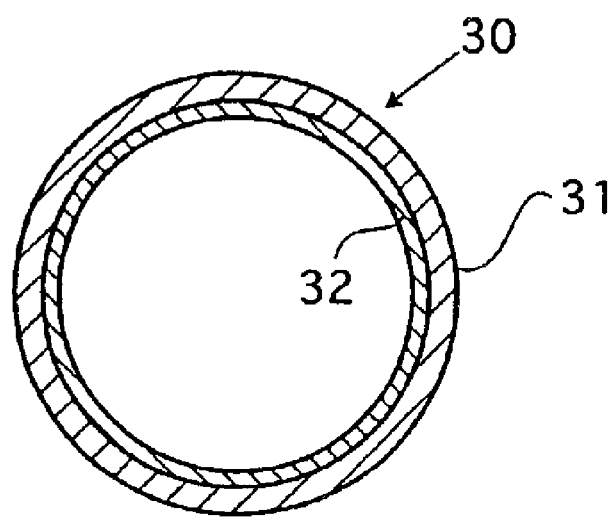
FIG. 8 is a cross-sectional view, taken perpendicularly to the tube axis, of a discharge tube that constitutes the fluorescent lamp shown in FIG. 7.

FIG. 8 is a cross-sectional view of the discharge vessel 30 taken as if it is sliced.

The discharge vessel 30 is composed of a glass tube 31 made of soda glass and has an inner surface coated with the phosphor layer 32.

Figure 9:
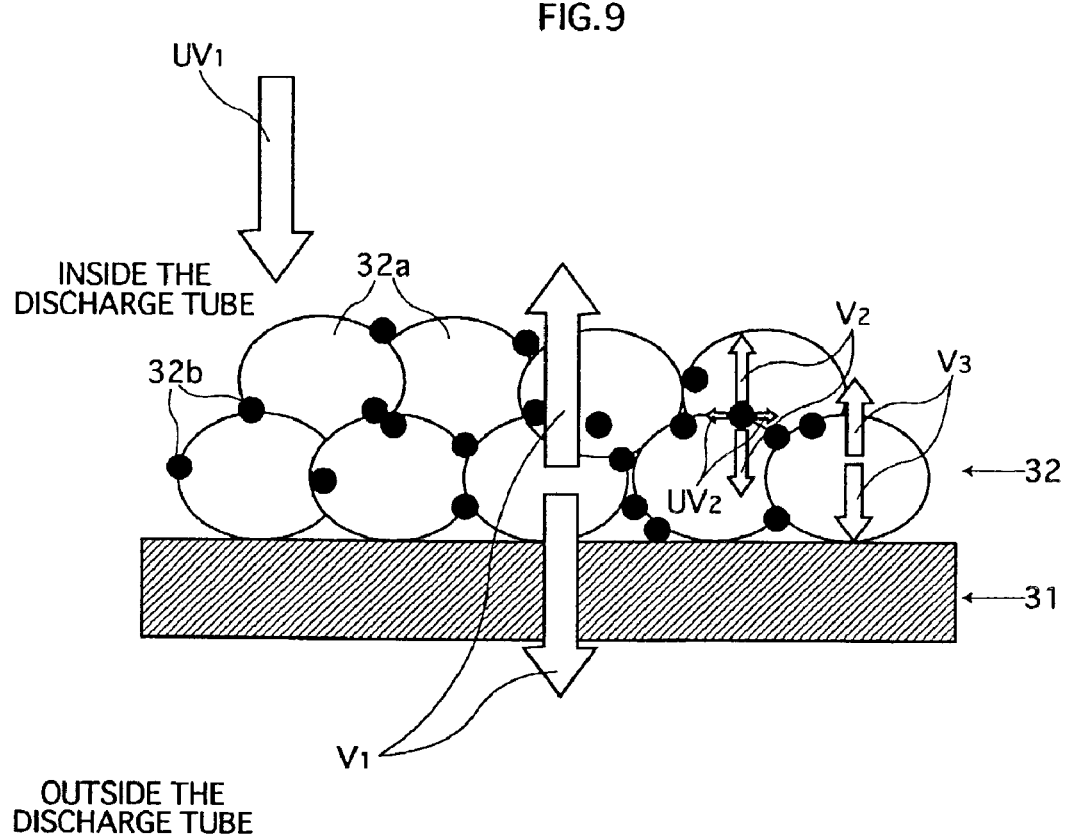
FIG. 9 is a schematic view showing light emission mechanism of the fluorescent lamp shown in FIG. 7.

As shown in FIG. 9, the phosphor layer 32 is formed of tri-band phosphor particles 32a that are bound together by a binder 32b.

The amount of binder 32b added to the phosphor particles 32a are determined to be within the range of 0.001 to 10 wt %.

The binder 32b contains, as a main component material, a mixture of (1) a compound formed by calcium oxide, barium oxide, and boron oxide, and (2) calcium pyrophosphate. Dissolved in the main component material is a luminescent component that converts ultraviolet radiation of 254 nm to ultraviolet radiation of longer wavelengths or to visible light.

Note that the main component is not limited to a mixture of (1) a compound formed by calcium oxide, barium oxide, and boron oxide, and (2) calcium pyrophosphate specified above. For example, the main component may be either a compound formed by calcium oxide, barium oxide, and boron oxide, or solely of aluminum oxide. In another example, the main component may be a mixture of aluminum oxide and calcium pyrophosphate.

Further, examples of a preferable luminescent component include an oxide of Gd, Tb, Eu, Nd, or Dy, each of which belongs to lanthanum series, and an oxide of Tl, Sn, Pb, or Bi, each of which belongs to 3B, 4B, or 5B group.

The content of the luminescent component in the binder is preferably within the range of 0.01 to 1 wt % when the luminescent component is an oxide of Tl, Sn, Ob, or Bi. When the luminescent component is an oxide of Gd, Tb, Eu, Nd, or Dy, the content is preferably within the range of 0.01 to 10 wt %.

The phosphor layer 32 as stated above is manufactured in the following manner.

That is, the main component and the luminescent component specified above are mixed together, dissolved and then formed to obtain a binder composition.

Phosphor particles and the thus obtained binder composition are dispersed in a binder-containing solvent to prepare dispersion liquid.

The thus prepared dispersion liquid is then applied to the inner surface of the glass tube 31, followed by drying and sintering to finally obtain the phosphors layer 32.

(Effect Achieved by Above-Stated Binder Composition)

FIG. 9 is a view illustrating light emission mechanism of the above fluorescent lamp.

The fluorescent lamp of the present embodiment is basically similar to a conventional fluorescent lamp in the mechanism of generating luminous flux. To be more specific, in response to a voltage applied to the electrodes in the discharge vessel 30 through a lighting circuit, discharge is generated in the discharge space inside the discharge vessel 30. Upon discharge, the mercury and rare-gas sealed within the discharge vessel 30 are excited to emit ultraviolet radiation UV1 (having a main wavelength at 254 nm). Being irradiated with the ultraviolet radiation UV1, the phosphor particles 32a are excited to emit visible light V1 (having a wavelength of about 400 nm or longer). The thus emitted visible light V1 constitutes most of the luminous flux of the discharge vessel 30.

In addition to the primary luminous flux described above, the fluorescent lamp of the present embodiment also emits secondary luminous flux (visible light V2 and V3) through the mechanism described below.

That is, the ultraviolet radiation UV1 generated inside the discharge vessel 30 irradiates the phosphor layer 32 where the ultraviolet radiation UV1 passes through the binder 32b and reaches the phosphor particles 32a. Since the binder 32b contains the luminescent component described above, the luminescent component is excited by the ultraviolet radiation UV1. Upon excitation, the binder 32b emits near ultraviolet radiation UV2 (having a longer wavelength than 254 nm) in addition to visible light V2.

Further, part of the near infrared radiation UV2 emitted from the binder 32b irradiates the phosphor particles 32a. Excited by the ultraviolet radiation UV2, the phosphor particles 32a emits visible light V3.

As above, the fluorescent lamp of the present embodiment emits not only primary luminous flux (visible light V1) but also secondary luminous flux (visible light V2, and V3) owing to the presence of the luminescent component in the binder 32*b*. Further, the luminescent component has almost no visible light adsorption. As a consequence, the luminous efficiency improves.

Still further, the ultraviolet radiation UV1 irradiates the phosphor particles that are located along the surface, of the phosphor layer 32, facing into the inner space. Consequently, the phosphor layer 32 emits the primary luminous flux, i.e., the visible light V1 mainly from the surface facing into the inner space.

On the other hand, the visible light V2 and V3 are emitted from the luminescent component present in the binder 32*b*. In other words, as compared with the visible light V1, the secondary luminous flux of the visible light V2 and V3 are emitted from locations relatively closer to the outer space.

Due to the generation locations, the visible light V2 and V3 are readily emitted to outside the lamp, and thus contribute effectively to improve luminous efficiency.

As apparent from later-described test results, when the binder contains an adequate amount of luminescent component, the secondary luminous flux (visible light V2+V3) is obtained so that the secondary luminous flux constitutes 2% or more of the overall luminous flux (visible light V1+V2+V3).

Among the oxides named above as a luminescent component, an oxide of lanthamide series element, especially of Gd, or Tb is promising for higher luminous efficiency for the following reasons.

That is, the above elements are especially preferable because the luminous spectrum emitted by such an oxide effectively excites phosphor particles that are generally used in a fluorescent lamp.

To be more specific, when the phosphor layer 32 is irradiated with ultraviolet radiation, the conversion efficiency to visible light differs depending on the wavelength of the ultraviolet radiation. The oxide of each preferable element named above emits light mainly at a wavelength of 260 to 400 nm, which is effectively converted to visible light by the phosphors employed in a generally used fluorescent lamp.

In addition, the oxide of each element named above is preferable also because the spectrum emitted by such an oxide composed of a relatively great amount of light in a region (at about 550 nm) that is highly sensitive to the human eye.

[Confirmatory Test 3]
(Test 3-1)

of the glass contained the following components in the amounts specified below.

$SiO_2$: 68 wt %,
$Al_2O_3$: 1.5 wt %,
$Na_2O$: 5 wt %,
$K_2O$: 7 wt %,
MgO: 5 wt %,
CaO: 4.5 wt %,
SrO: 5 wt %,
BaO: 6 wt %, and
$Li_2O$ 1 wt %

In addition, the phosphor layer 32 was made from tri-band phosphor particles with a color temperature of 5000K that were bound together by a binder composition.

The binder composition employed therein was made from a mixture, as a main component material, of (1) a compound of calcium oxide, barium oxide, and boron oxide ($0.3CaO.0.7BaO.1.6B_2O_3$), and (2) calcium pyrophosphate ($Ca_2P_2O_7$) at a ratio of 60:40 by weight. Additionally to the main component, the binder composition contained TlO (thallium oxide) in the amount of 0.3 wt %.

In each sample of the examples(examples 2–7), the content of the binder composition per 100 g of the phosphor particles was as shown in Table 7 (0.0005 g, 0.001 g, 0.1 g, 1 g, 10 g and 15 g, respectively).

On the other hand, the fluorescent lamp of the comparative example was provided with a phosphor layer manufactured from the binder composition with no TlO added thereto. Except the binder composition, the fluorescent lamp of the comparative example was basically similar in construction to the fluorescent lamps of the examples.

The fluorescent lamps of the examples and the comparative example were measured for the initial luminous flux value, the luminous flux maintenance factor, and the phosphor film strength.

Measurement Method:

The initial luminous flux value (100 h, lm) was measured after a life test of 100 hours.

The luminous flux maintenance factor was a ratio of the value measured after a life test of 4000 hours (repetitions of a 45-minute operation at intervals of a 15-minite shut-off period) to the initial luminous flux value.

To measure the phosphor film strength MPa, a high-pressure nitrogen gas was blown on the phosphor layer formed on the glass tube through a nozzle (φ0.5 mm) located at a distance of 5 mm. The pressure was raised at a

TABLE 7

| | Sample No. | 1 | 2 | 3 | 4 | 5 | 6 | 7 |
|---|---|---|---|---|---|---|---|---|
| | Binder g/Phosphor 100 g | 0 | 0.0005 | 0.001 | 0.1 | 1 | 10 | 15 |
| Lamp Property | Initial Luminous Flux (100 h)lm | 2300 | 2302 | 2350 | 2360 | 2390 | 2450 | 2320 |
| | Luminous Flux Maintenance Factor (4000 h)% | 75.5 | 75.6 | 75.3 | 75.6 | 75.8 | 75.6 | 76 |
| | Phosphor Film Strength MPa | 0.1 | 0.3 | 1 | 1.9 | 2.2 | 2.2 | 1.3 |

The sample No. 1 shown in Table 7 was a compact type fluorescent lamp of a comparative example, while the samples No. 2–7 were compact type fluorescent lamps of examples.

These fluorescent lamps uniformly have a length of 145 mm, a tube diameter of 12.5 mm, and a rated power of 32W.

Each fluorescent lamp of the examples 2–7 was provided with the glass tube 31 made of soda glass. The composition predetermined rate and the film strength was a pressure measured at the time a peel of the phosphor layer was observed.

Measurement Results and Relevant Discussion:

Table 7 shows the measurement results.

When comparing the sample No.2 containing as little as 0.0005 wt % of binder and the sample No. 1 containing no binder, there was almost no difference observed between their initial luminous flux values. Yet, the sample Nos. 3–7 each containing at least 0.001 wt % of binder exhibited the initial luminous flux values considerably higher than that of the sample No. 1. In addition, the sample Nos. 3–7 each exhibited considerably higher film strength than that of the sample No. 1.

Especially, each of the sample Nos. 3–6 containing from 0.001 to 10 wt % of binder exhibited a considerably high initial luminous flux value. When compared to the sample No.1, the values were higher by 2% or more.

On the other hand, the sample No. 7 containing the binder exceeding 10 wt % was lower than the sample Nos. 3–6 in both the initial luminous flux value and the film strength.

Regarding the luminous flux maintenance factor, there was almost no difference observed among the sample Nos. 1–7.

Confirmed in the test 1 was the binder composition to which 0.3 wt % of TlO was added as a luminescent component. It was also confirmed that by adding TlO within the range of 0.01 to 1 wt %, the initial luminous flux value improved by 2% or more. Further, by adding an oxide of Sn, Pb, or Bi to the binder within the range of 0.01 to 1 wt %, the initial luminous flux improved by 2% or more. Still further, by adding an oxide of Gd, Tb, Eu, Nd, or Dy to the binder within the range of 0.01 to 10 wt %, the initial luminous flux value improved by 2% or more.
(Test 3-2)

TABLE 8

| Sample No. | | 8 | 9 | 10 |
|---|---|---|---|---|
| Luminescent Component in Binder | | None | $Tb_2O_3$ | $Gd_2O_3$ |
| Lamp Property | Initial Luminous Flux (100 h)lm | 2300 | 2350 | 2380 |
| | Luminous Flux Maintenance Factor (4000 h)% | 75.5 | 75.6 | 75.3 |
| | Phosphor Film Strength MPa | 2 | 2 | 2 |

The sample No. 8 shown in Table 8 was a compact type fluorescent lamp of a comparative example, while the sample Nos. 9 and 10 were compact type fluorescent lamps of examples.

All the fluorescent lamps of sample Nos. 8–10 were similar in construction to the fluorescent lamps of sample Nos. 1–7 except the binder composition contained in the phosphor layer.

The fluorescent lamps were similar to the sample Nos. 1–7 also in the main component of the binder composition. To be more specific, the main component was a mixture of (1) a compound of calcium oxide, barium oxide, and boron oxide ($0.3CaO.0.7BaO.1.6B_2O_3$), and (2) calcium pyrophosphate ($Ca_2P_2O_7$) at a mixing ratio of 60:40 by weight.

In the sample No. 8, the main component stated above was used simply as it was.

In the sample No. 9, additionally to the main component stated above, the binder composition contained $Tb_2O_3$ (terbium oxide) as a luminescent component in the amount of 5 wt %.

In the sample No. 10, additionally to the main component stated above, the binder composition contained $Gd_2O_3$ (gadolinium oxide) as a luminescent component in the amount of 5 wt %.

In each of the sample Nos. 8–10, 0.5 g of the binder composition was mixed per 100 g of the phosphor particles.

The fluorescent lamps of each example and comparative example were measured for their initial luminous flux values, the luminous flux maintenance factors, and film strengths.

Measurement Results and Relevant Discussion:

Table 8 shows the measurement results.

There was almost no difference observed among the sample Nos. 8–10 either in the film strength or in the luminous flux maintenance factor. Yet, the sample Nos. 9 and 10 of the examples were 2% better than the sample No. 8 of the comparative example in the initial luminous flux value.

The results of the tests 3-1 and 3-2 confirmed that with an adequate amount of the binder containing a luminescent component, the initial luminous flux value was improved by 2% or more without reduction in the luminous flux maintenance factor.

[Embodiment 8]

Figure 10:
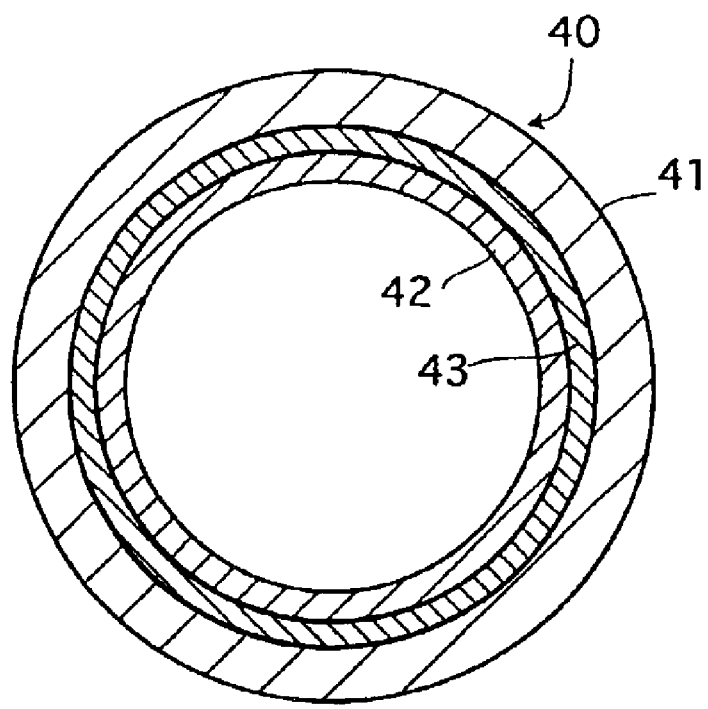
FIG. 10 is a cross-sectional view, taken perpendicularly to the tube axis, of a discharge tube that constitutes a fluorescent lamp according to an embodiment 8 of the present invention.

FIG. 10 is a view showing a cross-section of a discharge tube of a fluorescent lamp according to the present embodiment.

The fluorescent lamp of the present embodiment is similar to that of the embodiment 7 except that a discharge tube 40 is used in place of the discharge vessel 30. The discharge tube 40 is composed of a glass tube 41 provided with a phosphor layer 42 and a protective layer 43. The protective layer is provided so as to be sandwiched between the glass tube 41 and the phosphor layer 42.

The protective layer 43 is a transparent layer made from a material of the main component that is a metal oxide selected from zinc oxide (ZnO), titanium oxide ($TiO_2$), silicon oxide ($SiO_2$), and aluminum oxide ($Al_2O_3$). In the main component material, a luminescent component is dissolved. Specific examples of the luminescent component include an oxide of any element named in the description of the embodiment 1 (Tl, Sn, Pb, Bi, Gd, Tb, Eu, Nd, and Dy).

The content of the luminescent component in the protective layer preferably falls within the range of 0.01 to 30 wt %.

The phosphor layer 42 is basically similar to the phosphor layer 32 of the embodiment 7.

The protective layer 43 is manufactured in the following manner.

That is, powdery luminescent component is added to powdery metal oxide, which is a main component material of the protective layer 43. The mixture is then melted and ground to obtain a composite oxide powder. The thus obtained powder is then added to a solvent, such as water or an organic solvent (isopropyl alcohol), together with dispersant to obtain the mixture dispersed in liquid. The liquid is then applied onto an inner surface of the glass tube 41 with e.g., a spray method, and then dried and sintered to form the protective layer 43.

With the luminescent component being dissolved in the main component material, the metal oxide (ZnO, $TiO_2$, $SiO_2$, or $Al_2O_3$) contained in the main component is combined with the metal oxide in the luminescent component to form a composite oxide.

Note that the mixture powder may be applied to the inner surface of the glass tube 41 with a wet method as described above, or alternatively with an electrostatic coating method, or a sol-gel method using metal alkoxide dissolved in an organic solvent.

As described above, with the provision of the protective layer 43 containing the luminescent component, the fluorescent lamp has effects of improving both a luminous flux maintenance factor and luminous efficiency. The former effect is achieved by the main component of the protective layer 43, and the latter is achieved by the luminescent component.

The main component of the protective layer 43 has low permeability to sodium, so that the protective layer 43 does not pass through sodium diffused from the glass to the phosphor layer 42. As a consequence, there is an effect of suppressing darkening of the phosphor layer 42 resulting from the mercury reacting with sodium in the glass. In addition, the main component achieves another effect of suppressing deterioration of the phosphor particles, and thus improves luminous flux maintenance factor. Further, the luminescent component achieves an effect of improving luminous efficiency.

As described above, according to the present embodiment, the luminescent component is contained not only in the binder for the phosphor layer but also in the protective layer. Since the luminescent component contained in the protective layer also serves to generate luminous flux, the luminous efficiency improves further.

Note that it is applicable that the glass tube 41 does not contain a luminescent component. Yet, the presence of the luminescent component in the glass tube 41 is expected to further improve the luminous efficiency.

[Embodiment 9]

In this embodiment, description is given to the case where the present invention is applied to an HID lamp taking a mercury fluorescent lamp as an example.

The HID lamp of the present embodiment is similar to that of the embodiment 4 shown in FIG. 6 except a phosphor layer 56. Similarly to the phosphor layer 32 of the embodiment 7, the phosphor layer 56 is formed of phosphor particles bound by a binder composition. A material as the main component of the binder composition is a mixture of (1) a compound formed by calcium oxide, barium oxide, and boron oxide and (2) calcium pyrophosphate. The binder composition additionally contains a luminescent component dissolved in the main component material. The luminescent component converts ultraviolet radiation of 254 nm to ultraviolet radiation of a longer wavelength or to visible light.

Examples of the luminescent component include an oxide of one of the elements listed above, namely Gd, Tb, Eu, Nd, Dy, Tl, Sn, Pb, and Bi.

The mercury fluorescent lamp of the present embodiment is provided with the phosphor layer 56 that converts ultraviolet radiation to visible light with the phosphor particles and also with the luminescent component contained in the binder. Thus, the luminous efficiency is improved as compared with that of the fluorescent lamp provided with the phosphor layer of which binder contains no luminescent component.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lamp comprising a phosphor layer formed of phosphor particles bound together by a binder, the binder being manufactured from a binder composition comprising a luminescent component, the luminescent component containing two different rare-earth oxides, one being selected from the first group consisting of gadolinium oxide and praseodymium oxide, and the other being selected from the second group consisting of dysprosium oxide and neodymium oxide.

2. The lamp according to claim 1, further comprising a discharge tube composed of a glass tube, the glass tube being filled with mercury and a rare-gas and having the phosphor layer formed on an inner surface thereof, wherein a rare-earth oxide contained in the binder emits ultraviolet radiation and visible light upon exposure to ultraviolet radiation from the mercury in an excited state, a wavelength of the ultraviolet radiation from the binder being longer than a wavelength of the ultraviolet radiation from the mercury.

3. The lamp according to claim 2, wherein an overall luminous flux emitted from the lamp includes:

a first luminous flux formed of visible light emitted from the phosphor particles upon exposure to the ultraviolet radiation from the excited mercury;

a second luminous flux formed of visible light emitted by the luminescent component in the binder upon exposure to the ultraviolet radiation from the excited mercury; and a third luminous flux formed of visible light emitted from the phosphor particles upon exposure to the ultraviolet radiation from the luminescent component, the luminescent component emits the ultraviolet radiation upon exposure to the ultraviolet radiation from the excited mercury, and a total of the second luminous flux and the third luminous flux constitutes 2% of the overall luminous flux.

4. The lamp according to claim 1, wherein a content of the binder composition in the phosphor layer is 0.001 to 10 wt % of the phosphor particles.

5. A lamp comprising a phosphor layer formed of phosphor particles bound together by a binder, the binder being manufactured from a binder composition comprising, as a main component, one of (i) a mixture of calcium pyrophosphate and a compound formed by calcium oxide, barium oxide, and boron oxide, (ii) a compound formed by calcium oxide, barium oxide, and boron oxide, (iii) aluminum oxide, and (iv) a mixture of aluminum oxide and calcium pyrophosphate, the binder composition further comprising a luminescent component, the luminescent component containing at least one selected from the group consisting of gadolinium oxide, neodymium oxide, dysprosium oxide, thallium oxide, tin oxide, lead oxide, and bismuth oxide.

6. A glass composition for a lamp, comprising:

silicon dioxide as a main component;

a luminescent component containing at least one rare-earth oxide selected from the group consisting of praseodymium oxide, neodymium oxide, europium oxide, gadolinium oxide, terbium oxide, and dysprosium oxide;

at least one of aluminum oxide and diboron trioxide in an amount of at least 1 wt %;

at least one of $R_2O$ and R'O in an amount of 15 wt % or less, where R is at least one selected from the group consisting of lithium, sodium, and potassium, and R' is at least one selected from the group consisting of magnesium, calcium, strontium, barium, and zinc; and lead oxide in an amount of 1 to 40 wt %, wherein a content of the silicon dioxide is 55 to 85wt %, and a content of said at least one of the aluminum oxide and the diboron trioxide is 1 to 5 wt %.

7. The glass composition according to claim 6, wherein a thermal expansion coefficient of the glass composition is from $90 \times 10^{-7} K^{-1}$ to $100 \times 10^{-7} K^{-1}$.

8. A lamp, comprising:

a phosphor layer formed of phosphor particles bound together by a binder, the binder being manufactured from a binder composition comprising a luminescent component, the luminescent component containing two different rare-earth oxides, one being selected from the first group consisting of gadolinium oxide, terbium oxide, and praseodymium oxide, and the other being selected from the second group consisting of europium oxide, terbium oxide, dysprosium oxide, and neodymium oxide; and a discharge tube composed of a glass tube, the glass tube being filled with mercury and a rare-gas and having the phosphor layer formed on an inner surface thereof, wherein a rare-earth oxide contained in the binder emits ultraviolet radiation and visible light upon exposure to ultraviolet radiation from the mercury in an excited state, a wavelength of the ultraviolet radiation from the binder being longer than a wavelength of the ultraviolet radiation from the mercury.

9. The lamp according to claim 8, wherein an overall luminous flux emitted from the lamp includes:

a first luminous flux formed of visible light emitted from the phosphor particles upon exposure to the ultraviolet radiation from the excited mercury;

a second luminous flux formed of visible light emitted by the luminescent component in the binder upon exposure to the ultraviolet radiation from the excited mercury; and a third luminous flux formed of visible light emitted from the phosphor particles upon exposure to the ultraviolet radiation from the luminescent component, the luminescent component emits the ultraviolet radiation upon exposure to the ultraviolet radiation from the excited mercury, and a total of the second luminous flux and the third luminous flux constitutes 2% of the overall luminous flux.

10. A lamp, comprising:

a phosphor layer formed of phosphor particles bound together by a binder, the binder being manufactured from a binder composition comprising a luminescent component, the luminescent component containing two different rare-earth oxides, one being selected from the first group consisting of gadolinium oxide, terbium oxide, and praseodymium oxide, and the other being selected from the second group consisting of europium oxide, terbium oxide, dysprosium oxide, and neodymium oxide, wherein a content of the binder composition in the phosphor layer is 0.001 to 10 wt % of the phosphor particles.

11. A lamp comprising a glass member manufactured from the glass composition according to claim 6.

12. A glass composition for a lamp, comprising:

silicon dioxide as a main component having a content of 75 to 98.7 wt %;

a luminescent component containing at least one rare-earth oxide selected from the group consisting of praseodymium oxide, europium oxide, terbium oxide, and dysprosium oxide;

aluminum oxide having a content of 0.1 to 3 wt %;

diboron trioxide having a content of 0.1 to 3 wt %; and $R_2O$ in an amount of 0.1 to 3 wt %, where R is at least one selected from the group consisting of lithium, sodium, and potassium.

13. A lamp comprising a glass member manufactured from the glass composition according to claim 12.

14. A binder composition for a phosphor layer in a lamp, comprising, as a main component, one of (i) a mixture of calcium pyrophosphate and a compound formed by calcium oxide, barium oxide, and boron oxide, (ii) a compound formed by calcium oxide, barium oxide, and boron oxide, (iii) aluminum oxide, and (iv) a mixture of aluminum oxide and calcium pyrophosphate, the binder composition further comprising a luminescent component, the luminescent component containing at least one selected from the group consisting of gadolinium oxide, neodymium oxide, dysprosium oxide, thallium oxide, tin oxide, lead oxide, and bismuth oxide, wherein the luminescent component contains at least one selected from the group consisting of thallium oxide, tin oxide, lead oxide, bismuth oxide, a content of the selected at least one rare-earth oxide being 0.01 to 1 wt %.

* * * * *